(12) United States Patent
Tadepalli et al.

(10) Patent No.: US 12,537,241 B2
(45) Date of Patent: Jan. 27, 2026

(54) SYSTEM AND METHOD OF CONTROLLING A TEMPERATURE CONTROL SYSTEM BASED ON BOTH SYSTEM RELIABILITY AND BATTERY STATE

(71) Applicant: The AES Corporation, Arlington, VA (US)

(72) Inventors: Srikanth Tadepalli, Dayton, OH (US); Marwan Sherri, Dayton, OH (US); Sean Otto, Indianapolis, IN (US); Neal Babcock, Hampton, VA (US); Amy Lenneman, Lakewood, CO (US)

(73) Assignee: The AES Corporation, Arlington, VA (US)

( * ) Notice: Subject to any disclaimer, the term of this patent is extended or adjusted under 35 U.S.C. 154(b) by 0 days.

(21) Appl. No.: 18/611,929

(22) Filed: Mar. 21, 2024

(65) Prior Publication Data
US 2024/0322285 A1  Sep. 26, 2024

Related U.S. Application Data

(60) Provisional application No. 63/453,949, filed on Mar. 22, 2023.

(51) Int. Cl.
  *H01M 10/00* (2006.01)
  *H01M 10/48* (2006.01)
  (Continued)

(52) U.S. Cl.
  CPC ....... *H01M 10/633* (2015.04); *H01M 10/482* (2013.01); *H01M 10/486* (2013.01); *H01M 10/6564* (2015.04)

(58) Field of Classification Search
  CPC ............. H01M 10/633; H01M 10/482; H01M 10/486; H01M 10/6564
  See application file for complete search history.

(56) References Cited

U.S. PATENT DOCUMENTS

| 8,084,154 B2 | 12/2011 | Scheucher |
| 8,626,679 B2 | 1/2014 | Cho et al. |
| (Continued) | | |

FOREIGN PATENT DOCUMENTS

| CN | 104881001 A | 9/2015 |
| EP | 4067133 A1 | 10/2022 |
| WO | 2020206506 A1 | 10/2020 |

OTHER PUBLICATIONS

Becker, Johannes, and Vatsal P. Shukla. "Electric Vehicle Battery Thermal Management Systems Current Trends and Future Directions." Sage Science Review of Applied Machine Learning 5.2, Nov. 17, 2022: (pp. 47-66).

(Continued)

*Primary Examiner* — Nicholas P D'Aniello
(74) *Attorney, Agent, or Firm* — Lempia Summerfield Katz LLC

(57) ABSTRACT

A method and system for controlling a temperature control system based on both system reliability and battery state is disclosed. Batteries may supply power to places where the power grid is unavailable. The batteries may be housed in containers, with the temperature and humidity of the containers being controlled using a temperature control system. The system and method disclosed may select the temperature setpoint and humidity setpoint in order to operate the batteries within prescribed temperature and humidity values, while considering both the state of health of the batteries (e.g., the battery state of charge) and the state of health of the temperature control system (e.g., the failure of the compressors). In this way, the batteries may be operated within prescribed limits while accounting for both the health of the batteries and the health of the temperature control system.

50 Claims, 9 Drawing Sheets

(51) Int. Cl.
   *H01M 10/633*   (2014.01)
   *H01M 10/6564*  (2014.01)

(56) References Cited

U.S. PATENT DOCUMENTS

| | | | |
|---|---|---|---|
| 9,121,407 | B2 | 9/2015 | Pham |
| 9,496,730 | B2 | 11/2016 | Gallegos et al. |
| 9,827,871 | B2 | 11/2017 | Del Core |
| 10,436,851 | B2 | 10/2019 | Drees |
| 10,581,974 | B2 | 3/2020 | Sustaeta et al. |
| 11,480,621 | B2 | 10/2022 | Tajima et al. |
| 2004/0163398 | A1* | 8/2004 | Morishita ........... H01M 10/633 62/186 |
| 2006/0012342 | A1 | 1/2006 | Kamenoff |
| 2008/0234956 | A1 | 9/2008 | Mizuno et al. |
| 2021/0111446 | A1 | 4/2021 | Stewart |
| 2021/0226276 | A1 | 7/2021 | Sevel et al. |
| 2022/0045343 | A1 | 2/2022 | Song et al. |
| 2022/0283228 | A1 | 9/2022 | Uoshima |
| 2022/0283229 | A1 | 9/2022 | Uoshima |
| 2022/0318646 | A1 | 10/2022 | Benson |

OTHER PUBLICATIONS

International Search Report for International Application No. PCT/US2024/020 847 mailed on Jul. 1, 2024.

Written Opinion for International App. PCT/US2024/020847 mailed Jul. 1, 2024.

Harkat, Mohamed-Faouzi, Gilles Mourot, and José Ragot. "An improved PCA scheme for sensor FDI: Application to an air quality monitoring network." Journal of Process Control 16.6 (2006): 625-634.

Javid, G.; Ould Abdeslam, D.; Basset, M. "Adaptive Online State of Charge Estimation of EVs Lithium-Ion Batteries with Deep Recurrent Neural Networks". Energies 2021, 14, 758.

Rakesh Kumar, Applications of Grid-connected Battery Energy Storage Systems, EEPower, Feb. 17, 2023 https://eepower.com/technical-articles/applications-of-grid-connected-battery-energy-storage-systems/#.

Chunyang Zhao, Peter Bach Andersen, Chresten Traeholt, and Seyedmostafa Hashemi, "Grid-connected battery energy storage system: a review on application and integration", Elsevier, May 27, 2023, Division for Power and Energy Systems, Department of Wind and Energy Systems, Technical University of Denmark, Lyngby.

Marco Stecca, Laura Ramirez Elizondo, Thiago Batista Soeiro, Pavol Bauer, and Peter Palensky, "A Comprehensive Review of the Integration of Battery Energy Storage Systems Into Distribution Networks", IEEE Open Journal of the Industrial Electronics Society, May 22, 2020., Electrical Sustainable Energy Department, Delft University of Technology, Delft 2628 CD, the Netherlands.

* cited by examiner

SYSTEM AND METHOD OF CONTROLLING A TEMPERATURE CONTROL SYSTEM BASED ON BOTH SYSTEM RELIABILITY AND BATTERY STATE

REFERENCE TO RELATED APPLICATION

The present application claims priority to U.S. Provisional Application Ser. No. 63/453,949 (filed on Mar. 22, 2023), which is incorporated by reference herein in its entirety.

FIELD OF THE INVENTION

The present application relates generally to controlling a temperature control system. Specifically, the disclosure relates to controlling the temperature control system in order to provide ambient conditions for improved or increased life and performance of the batteries and to consider the effect on compressors or other hardware in the temperature control system.

BACKGROUND OF THE INVENTION

This section is intended to introduce various aspects of the art, which may be associated with exemplary embodiments of the present disclosure. This discussion is believed to assist in providing a framework to facilitate a better understanding of particular aspects of the present disclosure. Accordingly, it should be understood that this section should be read in this light, and not necessarily as admissions of prior art.

Batteries may be used to supply power in a variety of contexts. In one example, batteries may be used to supply power to places where a power grid is unavailable or an existing connection is not functioning. In another example, batteries may be used to supplement power in a grid. In either instances, the batteries may be housed in closed units called containers similar to those used for shipping and handling purposes. These containers may be temperature and humidity controlled using a temperature control system so that the batteries may operate within prescribed parameters in order to maintain peak performance and reduce or minimize degradation.

SUMMARY

In one or some embodiments, a control system configured to control a temperature control system is disclosed. The temperature control system is configured to control one or both of temperature or humidity for batteries in a space. The control system includes: a communication interface; and at least one controller in communication with the communication interface. The controller is configured to: access a battery state indicator indicative of a state of at least one aspect of the batteries; access a temperature control system reliability indicator indicative of reliability of at least one aspect of the temperature control system; determine one or both of setpoint temperature or setpoint humidity based on a combined analysis of an effect on the battery state indicator and the temperature control system reliability indicator; and send one or more controls, indicative of the one or both the setpoint temperature or the setpoint humidity, via the communication interface to the temperature control system so that the temperature control system to control the space based on the one or both of the setpoint temperature or the setpoint humidity.

In one or some embodiments, a method for controlling a temperature control system is disclosed, with the temperature control system configured to control one or both of temperature or humidity for batteries in a space. The method includes: accessing a battery state indicator indicative of a state of at least one aspect of the batteries; accessing a temperature control system reliability indicator indicative of reliability of at least one aspect of the temperature control system; determining one or both of setpoint temperature or setpoint humidity based on a combined analysis of an effect on the battery state indicator and the temperature control system reliability indicator; and sending one or more controls, indicative of the one or both the setpoint temperature or the setpoint humidity, via a communication interface to the temperature control system so that the temperature control system to control the space based on the one or both of the setpoint temperature or the setpoint humidity.

BRIEF DESCRIPTION OF THE DRAWINGS

The present application is further described in the detailed description which follows, in reference to the noted plurality of drawings by way of non-limiting examples of exemplary implementations, in which like reference numerals represent similar parts throughout the several views of the drawings. In this regard, the appended drawings illustrate only exemplary implementations and are therefore not to be considered limiting of scope, for the disclosure may admit to other equally effective embodiments and applications.

DETAILED DESCRIPTION OF THE INVENTION

Figure 1:
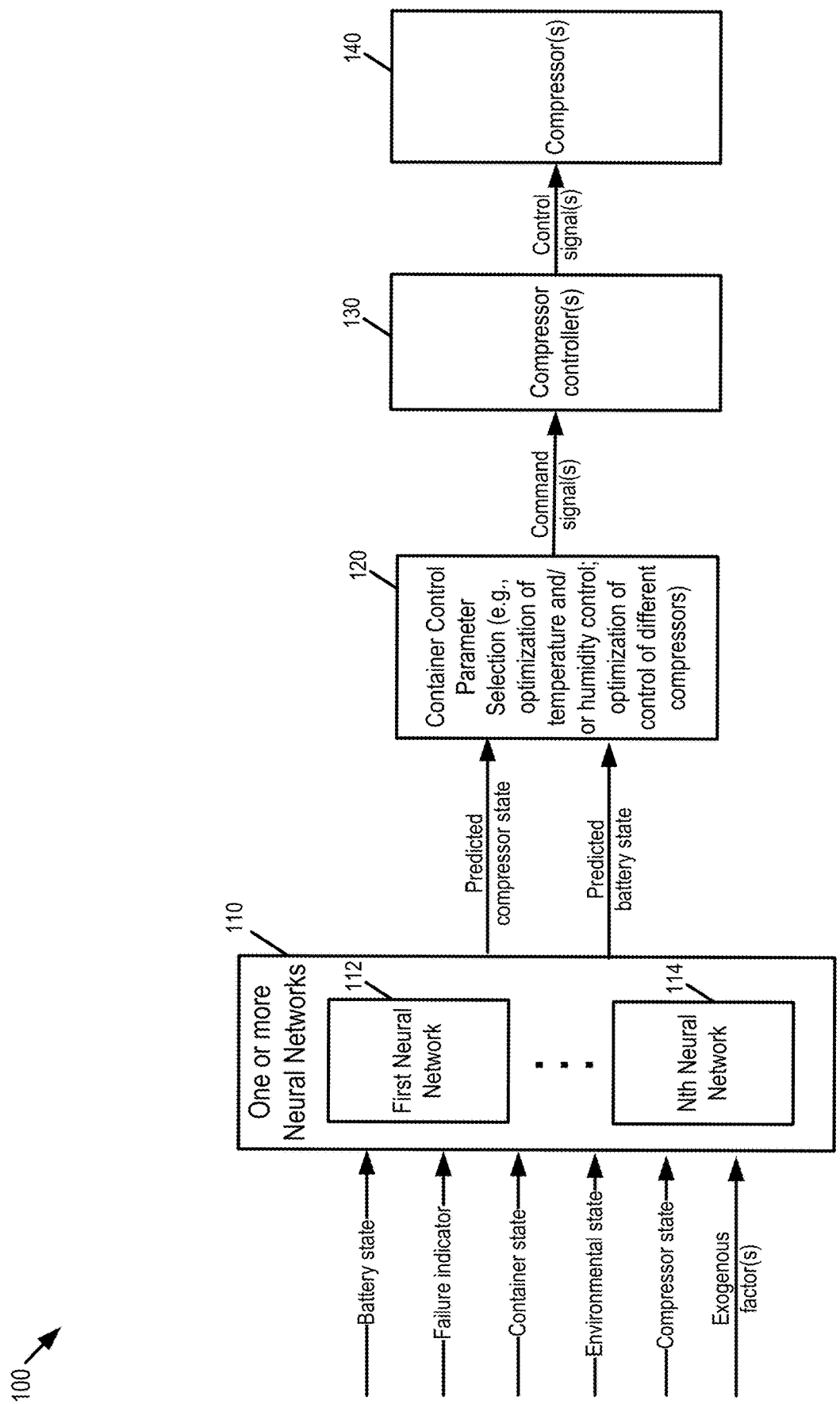
FIG. 1 is a block diagram illustrating a high-level system architecture for determining and controlling a temperature control system.

The methods, devices, systems, and other features discussed below may be embodied in a number of different forms. Not all of the depicted components may be required, however, and some implementations may include additional, different, or fewer components from those expressly described in this disclosure. Variations in the arrangement and type of the components may be made without departing from the spirit or scope of the claims as set forth herein. Further, variations in the processes described, including the addition, deletion, or rearranging and order of logical operations, may be made without departing from the spirit or scope of the claims as set forth herein.

It is to be understood that the present disclosure is not limited to particular devices or methods, which may, of course, vary. It is also to be understood that the terminology used herein is for the purpose of describing particular embodiments only and is not intended to be limiting. As used herein, the singular forms "a," "an," and "the" include singular and plural referents unless the content clearly dictates otherwise. Furthermore, the words "can" and "may" are used throughout this application in a permissive sense (i.e., having the potential to, being able to), not in a mandatory sense (i.e., must). The term "include," and derivations thereof, mean "including, but not limited to." The term "coupled" means directly or indirectly connected. The word "exemplary" is used herein to mean "serving as an example, instance, or illustration." Any aspect described herein as "exemplary" is not necessarily to be construed as preferred or advantageous over other aspects. The term "uniform" means substantially equal for each sub-element, within about ±10% variation.

As used herein, "obtaining" data generally refers to any method or combination of methods of acquiring, collecting, or accessing data, including, for example, directly measuring or sensing a physical property, receiving transmitted data, selecting data from a group of physical sensors, identifying data in a data record, and retrieving data from one or more data libraries.

As used herein, terms such as "continual" and "continuous" generally refer to processes which occur repeatedly over time independent of an external trigger to instigate subsequent repetitions. In some instances, continual processes may repeat in real time, having minimal periods of inactivity between repetitions. In some instances, periods of inactivity may be inherent in the continual process.

If there is any conflict in the usages of a word or term in this specification and one or more patent or other documents that may be incorporated herein by reference, the definitions that are consistent with this specification should be adopted for the purposes of understanding this disclosure.

As discussed in the background, batteries may be housed in containers or the like that are temperature and/or humidity controlled. Generally speaking, the batteries are operated within a predetermined range (e.g., a predetermined temperature range and/or a predetermined humidity range) in accordance with the technical specifications of the batteries. In this way, the batteries may operate in an environment in order to create predetermined, such as optimal, ambient conditions, for improved or increased life and performance of the batteries. Deviations from the predetermined ambient conditions may be due to a variety of things, such as the environment in which the batteries are located (e.g., a high temperature/high humidity environment) and/or due to operations of the batteries (e.g., solar panels pushing energy into the batteries that result in greater heat within the container housing the batteries). Thus, one or more temperature control systems may control the temperature and/or humidity of the containers. One example of a temperature control system comprises a heating, ventilation, and air conditioning (HVAC) system. Other temperature control systems are contemplated, such as heat pumps, evaporative coolers, radiant cooling, or the like, and may be leveraged. As such, a control system, which may control the temperature control system, may select and command the control of the environmental conditions (e.g., temperature and/or humidity). However, since the containers that contain the batteries also interact with the external environment, outside temperature (e.g., temperature outside of the container) and outside humidity (e.g., humidity outside of the container) may affect the health and/or state of the batteries within the container.

In one or some embodiments, the temperature control system includes hardware to control the environmental conditions. As one example, one or more compressors and/or one or more blowers may be used by the HVAC system in order to control temperature and/or humidity. However, the compressor(s) may be overused (e.g., high compressor cycling) adversely affecting the compressors (e.g., a lower mean time between failures (MTBF) and/or lower remaining useful life (RUL)) and/or adversely affecting the health of the batteries (e.g., a decreased battery state of charge (SoC)). For example, compressor failure necessitates an expensive replacement with significant downtime, during which the battery health may begin to deteriorate when the temperature control system fails. Likewise, in particularly humid areas, compressors may fail due to corrosion caused by humidity. Similarly, the blowers may be overused, reducing their usable life.

As such, in one or some embodiments, a method and system are disclosed that controls the temperature control system based on a combined analysis of an effect (such as a predicted or estimated effect) on one or more of the batteries and an effect (such as a predicted or estimated effect) on part or all of the temperature control system (such as an effect on the health of one or more of the compressors and/or other equipment that many be required in the temperature control system). The control of the temperature control system may comprise controlling one or more aspects of the temperature control system, such as any one, any combination, or all of: the setpoint temperature for the temperature control system; the setpoint humidity for the temperature control system; the cycling of the compressors (e.g., the time between the on and off for a respective compressor); the lead/lag of the compressors; etc. In this way, the method and system may select a subrange (e.g., the subranges of temperature and/or humidity) or specific value(s) of operation such that: (i) the subrange (or specific value(s)) are within the predetermined range of operation of the batteries (e.g., the method and system select the subrange for temperature to be within the predetermined recommended temperature range of operation of the batteries and/or the subrange for humidity to be within the predetermined recommended humidity range); and (ii) the subrange (or specific value(s)) are selected based on the health of the temperature control system (e.g., the subrange selected is tailored to compressor performance). Thus, the system and method may control the temperature control system (e.g., the selection of the setpoint temperature and/or the setpoint humidity and/or the lead/lag loading) based on an analysis of the health of at least a part of the temperature control system (e.g., whether the selection maintain or will increase the life of the compressor(s)) and based on the health of the batteries (e.g., whether the selection will maintain the batteries in the predetermined temperature range and/or whether there is no deterioration or no appreciable deterioration (such as less than 5% deterioration; less than 4% deterioration; less than 3% deterioration; less than 2% deterioration; less than 1% deterioration) in the SoC).

In one or some embodiments, the control of the temperature control system may be manifested in one or more neural networks in combination with an optimizer. In particular, in one or some embodiments, one or both of the indicator of the estimated or predicted effect on the one or more batteries (e.g., the indicator of the estimated or predicted effect on the battery SoC) or the indicator of the estimated or predicted effect on the part or all of the temperature control system (e.g., the indicator of the estimated or predicted effect on the MTBF of the compressor(s) and/or the blower(s)) may be generated by one or more neural networks.

In a specific embodiment, a first neural network may be used to generate the indicator of the estimated or predicted effect on the one or more batteries and a second neural network may be used to generate the indicator of the estimated or predicted effect on the part or all of the temperature control system (e.g., on the compressor(s) and/or the blower(s)). Further, in one or some embodiments, at least one input to one of the first neural network or the second neural network may be different from the other of the first neural network or the second neural network. More specifically, at least one input to the first neural network, used to generate the indicator of the estimated or predicted effect on the one or more batteries, may be different from each of the inputs to the second neural network used to generate the indicator of the estimated or predicted effect on the part or all of the temperature control system. Similarly, at least to the second neural network may be different from each of the inputs to the first neural network. In this way, the neural network(s) may be tailored to the specific temperature control system (e.g., the compressors in the HVAC system) and/or to the specific battery system (e.g., the power banks).

Further, in one or some embodiments, the output(s) of the neural networks may be input to the optimizer. For example, the indicators of the estimated or predicted effect on the one or more batteries and the estimated or predicted effect on the part or all of the temperature control system may be input to a container control optimization, which may select the setpoint(s) and/or the load(s) considering both indicators. In one or some embodiments, the setpoint(s) are selected so that any one or any combination of the following occurs: a maintaining of the indicators (e.g., the MTBF for the compressor(s) stays the same if respective setpoint(s) are selected); an improvement in the indicators (e.g., an increase in the MTBF, indicating that the compressors will fail later in time); or a no-more-than predetermined decrease in the indicators (e.g., the MTBF decreases no more than 10%). Responsive to the container control optimization selecting the setpoint(s), the container control optimization may control one or both of the setpoint temperature for the temperature control system or the setpoint humidity for the temperature control system. In this way, the temperature control system, including one or more of its components (e.g., the compressor, the blower, etc.) may have its usable life increased.

For example, a respective container may include a single compressor configured to control the temperature and/or humidity with the respective container. The method and system may generate one or more commands to control the single compressor. As another example, the respective container may include multiple compressors for zoned temperature control of the respective container. Thus, in one particular implementation, the method and system may generate one or more commands to control each of the compressors based on the combined analysis of the effect on the batteries in a respective zone and on the effect on a respective compressor within the respective zone. The control of the respective zones may be different based on the analysis, such as selecting different temperature and/or humidity setpoints for the HVACs assigned to the different zones. Alternatively, or in addition, the method and system may generate one or more commands to control each of the compressors differently (e.g., a first compressor comprises a lead compressor so that the first compressor bears a greater load and a second compressor comprises a lag compressor so that the first compressor bears a lesser load than the first compressor) based on the combined analysis of the effect on the batteries in the container(s) and on the effect on a respective compressor.

In one or some embodiments, the effect on the one or more batteries may comprise an indicator of the estimated or predicted effect on the battery SoC. In one or some embodiments, the effect on part or all of the temperature control system may comprise an indicator of the estimated or predicted effect on a health indicator for the compressor(s) and/or the blowers of the temperature control system. Various health indicators (e.g., the MTBF and/or the RUL) for one or more parts of the temperature control system are contemplated. Further, the health indicator may be generated in one of several ways. In one way, the health indicator may be generated as an average (e.g., an average MTBF calculated from the MTBF for a first compressor and the MTBF for a second compressor in a current cycle; an average MTBF calculated across multiple cycles). In another way, the health indicator may comprise a selection from a set of available health indicators. As one example, a lower (or a lowest) MTBF may be selected from a set of calculated or estimated MTBFs (e.g., in a temperature control system with a first compressor and a second compressor, selecting the lower MTBF from the estimated MTBF of the first compressor and the estimated MTBF of the second compressor). As another example, the estimated or predicted MTBF may be an amalgam of the compressors and/or other components in the temperature control system or may be for individual compressors and/or other components in the temperature control system (e.g., an average of the MTBF for each of the compressors in the temperature control system).

Further, the combined analysis may comprise a container control selector (such as a container control optimization) that is configured to select (e.g., optimize) any one, any combination, or all of: the setpoint temperature; the setpoint humidity; or the load(s) imposed on the compressor(s) (e.g., amount of load to the lead and lag compressors in a temperature control system that has multiple compressors). In particular, in one or some embodiments, the selection of any one, any combination, or all of the setpoint temperature; the setpoint humidity; or the load(s) imposed on the compressor(s) may be dependent on both of the effect on the one or more batteries and the effect on part or all of the temperature control system (e.g., on one or both of the compressor(s) or the blower(s)).

With regard to setpoint temperature and/or setpoint humidity, in one or some embodiments, the analysis may select from a designated or predefined range (e.g., a range of acceptable temperature, such as 18-28° C.) and/or a designated or predefined range of humidity. In this regard, the analysis may select within the acceptable ranges (e.g., a subset of the designated or predefined range) while still accounting for stress on the temperature control system and stress on the batteries. As discussed above, simply selecting the setpoint temperature to be within the range of acceptable temperature may result in excessive use of the compressor, and in turn, reduced usable life of the compressor. In contrast, the method and system at least partly account for the effect on the usable life of the compressor, thereby potentially extending the useful life of the compressor(s) and potentially providing an earlier indicator of failure for the respective part (e.g., compressor corrosion) based on anomaly identification, and in turn increasing the ability of the batteries to maintain continuity of electricity delivery to the grid.

With regard to the load(s) imposed on the compressor(s), the container control selector (such as the container control optimization) may analyze one or more factors, such as any one, any combination, or all of the following to determine the load(s) imposed on the compressor(s): the health indicator for one or more parts of the temperature control system in order to determine the load(s) imposed on the compressor(s); input indicative of a goal to control the one or more parts of the temperature control system; or one or more metrics for the compressor(s) (e.g., any one, any combination, or all of: previous differential loading (such as previous differential loading patterns); respective compressor maintenance history; or length of time a respective compressor has been in service).

Thus, in one or some embodiments, the container control selector may analyze a current health indicator (e.g., a currently estimated MTBF or a currently estimated RUL) in making the load decision. Alternatively, or in addition, the container control selector may analyze a previous health indicator (e.g., a previously estimated MTBF or a previously estimated RUL) in making the load decision. In either instance, in making the load decision (e.g., in determining which compressor is the lead compressor and which compressor is the lag compressor and/or in determining the amount (such as the percentage) of lead or lag), the health indicator may be considered in determining the extent of load to be imposed on one or both compressors. By way of one example, responsive to determining that the health indicator of a respective compressor has a predetermined trend (e.g., the MTBF is trending downward), the container control selector may determine to change the loading for the respective compressor (e.g., reduce the percentage load on the respective compressor, effectively lightening the load for the respective compressor) since the respective compressor may fail sooner than expected. By way of another example, responsive to determining that the health indicator of a respective compressor has another predetermined trend (e.g., the MTBF is steady and/or increasing), the container control selector may determine to keep the loading for the respective compressor RUL the same. In this regard, in one or some embodiments, the health indicator (e.g., the current health index/score) may be used as a benchmark for an impact assessment on the compressor(s), so that if the health indicator (e.g., the current health score) does not support a lead-lag decision, the container control selector maintains the status quo. Thus, the container control selector may analyze the health indicator (e.g., based on the impact on RUL and/or MTBF) in determining the loading of the compressors.

Alternatively, or in addition, the container control selector may analyze input indicative of one or more goal to control the one or more parts of the temperature control system. Various goals are contemplated. As one example, the goal may comprise maintaining the health of both compressors at least above a predetermined amount (e.g., a first predetermined amount). In this way, the temperature control system may be assured (within a reasonable certainty) that both compressors will function. As another example, the goal may comprise maintaining the health of at least one compressor at least above a predetermined amount (e.g., a second predetermined amount that is greater than the first predetermined amount). In this way, the temperature control system may be assured (within a reasonable certainty) that at least one compressor will function, even though the other compressor does not. As still another example, the goal may be based on maintenance, such as scheduled maintenance. In particular, in the event that the maintenance is scheduled for a predetermined time (e.g., four months) into the future, the container control selector may select the load(s) for the compressors so that maintenance can be delayed for at least the predetermined time when the maintenance can be performed (e.g., the selection of loads results in both compressors not needing maintenance for at least four months time, when the maintenance is scheduled). As yet another example, the goal may be based budgetary in nature, such as conforming to budgetary information or constraints. In particular, in the event that of a limitation that costs cannot be incurred for at least a predetermined amount of time (e.g., the cost of replacing a compressor cannot be incurred for at least three months), the container control selector may select the load(s) for the compressors so that such a cost will not be incurred for at least the predetermined amount of time. In this regard, the container control selector may select the loads based on one or more defined goals.

In one or some embodiments, the input may be dynamically provided, such as by an operator of the container control selector. Alternatively, or in addition, the input may be predetermined, such as stored (upon manufacture and/or upon programming of the container control selector) in a memory accessible by the container control selector.

Still alternatively, the container control selector may analyze one or more metrics for the compressor(s). As discussed above, various metric are contemplated, including any one, any combination, or all of: previous differential loading (such as previous differential loading patterns); respective compressor maintenance history; or length of time a respective compressor has been in service). In one or some embodiments, the various factors analyzed by the container control selector are mutually exclusive of one another. As one example, the goals and the health of the compressors may be separate with no overlap. Alternatively, or in addition, the various factors analyzed by the container control selector may overlap with one another. For example, the health of the compressors may be at least partly dependent on the metrics for the compressor(s). In particular, compressor maintenance history may be used as one of the metrics for the compressor and as one of the indicators of the health of the compressor.

Thus, in one or some embodiments, the container control selector may determine the load(s) of the compressors, as discussed above. Further, in one or some embodiments, the container control selector may determine the load(s) of the compressors in a dynamic manner in one of several ways. In a first dynamic manner, the container control selector may determine the load(s) of the compressors only after a determination of sufficiency to make the determination. For example, initially, the system may not have sufficient history to make the determination as to the load(s) of the compressors. As such, initially, the container control selector may equally load the compressors (e.g., effectively designating no lead compressor and no lag compressor). After determining the sufficiency, the container control selector may determine the load(s) of the compressors (e.g., 65% of load to the lead compressor and 35% load to the lag compressor). The container control selector may determine sufficiency in a variety of ways. In a first variety, the container control selector may determine whether it has undergone a predetermined number of iterations (or loops) in control of the system (e.g., a single iteration comprises: generating outputs from the neural network(s); optimizing to determine setpoint temperature and/or setpoint humidity; and control of compressors (such as via SCADA, discussed below)). In this regard, after the predetermined number of iterations has been met (or exceeded), the container control selector may determine that a sufficient history for the compressors has been established, thereby indicating that the container control selector may determine the load(s) of the compressors. In a second variety, the container control selector may determine an amount of data collected regarding the compressors in determining sufficiency. Thus, initially, the container control selector may operate in a feed forward manner; after sufficiency, the container control selector may operate in a feedback manner.

Alternatively, or in addition, a second dynamic manner may comprise the container control selector dynamically selecting one or both of: (i) which of the plurality of compressors is the lead compressor and/or the lag compressor; or (ii) the amount of leading/lagging. In particular, which compressor is the lead or lag compressor may be time dependent. Generally speaking, a healthier compressor (such as indicated by the health indicator) may be designated as the lead compressor (and may assume more of the percentage load). Further, conversely, a compressor is designated to lag if the compressor is underperforming and/or undergone recent maintenance.

Figure 2:
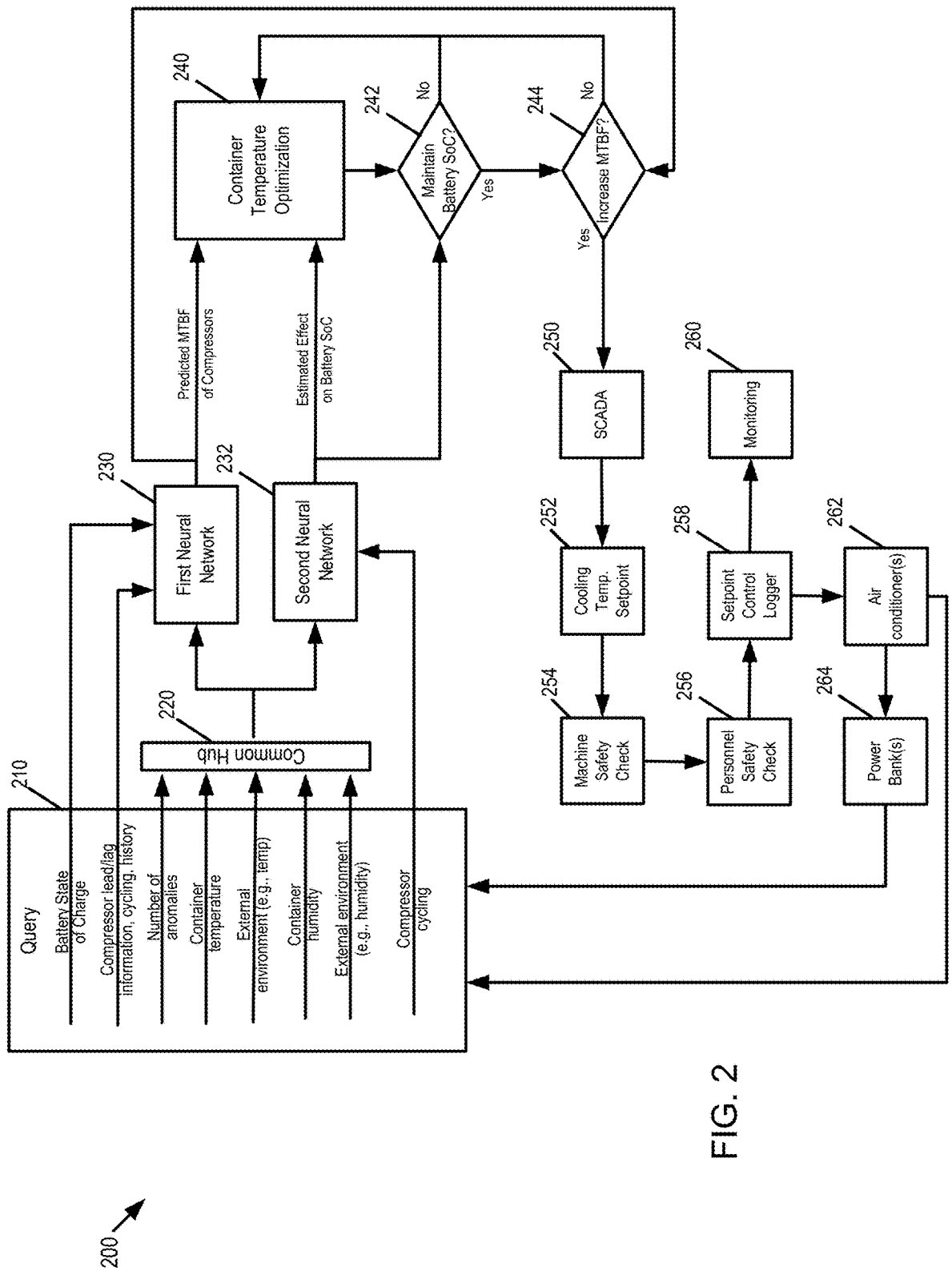
FIG. 2 is a block diagram illustrating a more detailed system architecture for determining and controlling the temperature control system.

Referring to the figures, FIG. 1 is a block diagram 100 illustrating a high-level system architecture for determining and controlling a temperature control system. As shown, the architecture may include one or more neural networks 110, such as a first neural network 112 to an Nth neural network 114 (where N is any integer greater than 1). The one or more neural networks 110 may receive one or more inputs, such as one or more exogenous factors and/or one or more endogenous factors. For example, the one or more neural networks 110 may receive any one, any combination, or all of: battery state; failure indicator (e.g., an anomaly indicator); container state; environmental state; compressor state; or exogenous factor(s). The battery state may be indicative of at least one aspect of the batteries, such as the battery SoC (see FIG. 2). The failure indicator may be indicative of failure (such as a prediction of one or more failures) of at least a part of the system, such as a number of anomalies (see FIG. 2). The container state may be indicative of at least one aspect of the container, such as one or both of the container temperature (e.g., a temperature sensor sensing temperature within one or more parts of the container) or the container humidity (e.g., a humidity sensor sensing humidity within one or more parts of the container) (see FIG. 2). The environmental state may be indicative of at least one aspect of the environment, such as one or both of the external environment temperature or the external environment humidity (see FIG. 2). The compressor state may be indicative of at least one aspect of the compressor, such as any one, any combination, or all of compressor cycling (e.g., previous compressor cycling), compressor history (e.g., compressor operation history (such as length of use of compressor) and/or compressor maintenance), or compressor lead/lag information (such as previous lead/lag operation for the compressors), as illustrated in FIG. 2. Exogenous factors may include one or both of maintenance scheduling or budgetary scheduling. Though not shown, other aspects may be input. As one example, the blower state of the blower system may be input. As another example, operator input, such as one or more goals, may be input as well.

As shown in FIG. 1, the one or more neural networks 110 may generate one or more outputs, such any one, any combination, or all of the predicted compressor state (such as the predicted MTBF of the compressors, see FIG. 2), the predicted battery state (such as the estimated effect on battery SoC, see FIG. 2), or the predicted blower state. In turn, the one or more outputs from the one or more neural networks 110 may be input to container control parameter selection 120.

In one or some embodiments, container control parameter selection 120 is an example of the container control selector and is configured to select setpoints, such as temperature setpoint and/or humidity setpoint. In the example of a single compressor in the system, the container control parameter selection 120 is configured to select any one, any combination or all of: the temperature setpoint; the humidity setpoint; the compressor cycling (e.g., the number of times in which the compressor is turned on; the number of times in which the compressor is turned off; the frequency in which the compressor is turned on/off); etc. In the example of multiple compressors in the system, the container control parameter selection 120 is configured to select any one, any combination or all of: the temperature setpoint of each compressor (which may be the same or different for different compressors); the humidity setpoint (which may be the same or different for different compressors); the compressor cycling (e.g., the number of times in which a respective compressor is turned on; the number of times in which a respective compressor is turned off; the frequency in which a respective compressor is turned on/off; which respective compressor takes the lead in temperature control (and the respective percentage operation); which respective compressor lags in temperature control (and the respective percentage operation); etc. Thus, in the instance of multiple compressors, the control of the multiple compressors may be the same (e.g., no leading or lagging compressors) or may be different in one or more respects such that the combined control of the multiple compressors result in: the desired environmental control of the batteries; and the desired predicted result (e.g., the MTBF) for the system. In this regard, in one or some embodiments, the container control parameter selection 120 comprises a container temperature and/or humidity optimizer.

As discussed in more detail below, container control parameter selection 120 may comprise an optimization routine configured to optimize the selection of the setpoint(s). In one or some embodiments, the optimization routine may search for a local optimum in selecting the setpoint(s). Alternatively, the optimization routine may search for a global optimum in selecting the setpoint(s).

Responsive to selecting the setpoint(s), the container control parameter selection 120 may generate and send one or more command signals via a communication interface to one or more compressor controllers 130, with the one or more command signals indicative of the setpoint(s) selected. The communication interface may comprise any type of interface (e.g., a wireless communication interface; a wired communication interface; an Internet connection; etc.) that transmits the one or more command signals to one or more compressor controllers 130. In turn, the one or more compressor controllers 130 may generate and send the one or more control signals to the compressor(s). In this way, the compressor(s) 140, interpreting the control signal(s), may control itself to the selected setpoint(s).

FIG. 2 is a block diagram 200 illustrating a more detailed system architecture for determining and controlling the temperature control system. As shown, query block 210 may include one or more inputs for use by the first neural network 230 (which is configured to generate a predicted MTBF of compressors) and/or the second neural network 232 (which is configured to generate an estimated effect on battery SoC). Various inputs are contemplated, such as any one, any combination, or all of: battery information (e.g., battery SoC); compressor operation (e.g., any one, any combination, or all of compressor lead/lag information, compressor history (such as compressor maintenance history and/or length of time the compressor has been in service), compressor cycling); sensed information (e.g., sensed temperature and/or sensed humidity inside or outside of the container); determined information (e.g., number of anomalies); or operator input information (e.g., goals). FIG. 2 illustrates an example of such input, specifically query block 210, which inputs battery SoC; compression lead/lag information, compressor cycling, compressor history; number of anomalies; container temperature; external environment temperature; container humidity; external environment humidity; or compressor cycling. Other inputs in addition to, or instead of, those illustrated in FIG. 2 are contemplated.

In this regard, different variations for the neural networks 230, 232 (and the inputs to the neural networks) and to the container compressor optimization 240 are contemplated. Merely for example, a first variation may comprise a focus on an optimal SOC impacted MTBF due to high compressor cycling whereas a second variation may comprise a focus on increasing MTBF via optimal compressor cycling resulted in SOC not being at the desired level. The different variations may be supported with different inputs to the neural networks 230, 232, such as the SoC and/or compressor cycling being input to either the first neural network 230, the second neural network 232, or both.

For example, the number of anomalies may be an indicative of the current health of the temperature control system. As one example, the number of anomalies may be an indicator or a predictor of upcoming fault(s) in the system. Further, the number of anomalies (or another indicator of the occurrence pattern of anomalies) as an independent input to the first neural network 112 may make the first neural network 112 more robust in generating the MTBF prediction of compressors because of inherent fault conditions being included in the first neural network 112.

As shown in FIG. 2, one input may comprise container temperature. In one embodiment, a single temperature measurement may be used as an input. Alternatively, multiple temperature sensors may reside within the container, with respective sensor data from the multiple temperature sensors being used as a heat map to indicate temperature variations within the container. In one or some embodiments, the multiple temperature sensors may be used in one or more ways. In one way, the multiple temperature sensors may be used to determine which power bank has the highest temperature. In this way, the most problematic temperature (e.g., the highest temperature) may be used as input for the container temperature. Thus, given the changing conditions within a respective day, different parts of the container may be hotter or cooler. As such, the respective temperature sensor used as input may change over the course of the day, resulting in a dynamic selection of the respective temperature used as input. Alternatively, or in addition, analysis of the sensor data from the multiple temperature sensors may be used to determine accuracy of a respective temperature sensor. For example, analysis of sensor data may indicate data drift and therefore an unreliable sensor. Thus, in one or some embodiments, the sensor selected may comprise the sensor that is both most proximate to the power bank that is most problematic (e.g., has the highest temperature) and indicates smaller (or the smallest) drift.

In one or some embodiments, the inputs shown in FIG. 2 may be independent of one another and hence may be used to create the first neural network 230 and the second neural network 232. Further, each of the first neural network 230 and the second neural network 232 may provide or include weights to every independent variable.

Further, the more detailed system architecture may include common hub 220 for inputs that are common to both the first neural network 230 and the second neural network 232. In addition, at least one input is not common to the first neural network 230 and the second neural network 232. For example, as shown in FIG. 2, battery SoC is input to the first neural network 230 whereas compressor cycling is input to the second neural network 232. In this way, the first neural network 230 and the second neural network 232, using knowledge of anomalies and their occurrence along with additional parameters of container temperature and humidity, environmental temperature, environmental humidity, battery SoC, and compressor cycling, may predict the MTBF of compressors and the estimated effect on the battery SoC via neural net modeling.

As shown in FIG. 2, the predicted MTBF of the compressors (which may indicate a time period, such as a number of days, until a failure in the compressors) and the estimated effect on battery SoC may be input to container temperature optimization 240. The container temperature optimization 240 may comprise an optimization algorithm configured to select any one, any combination, or all of the setpoint temperature within a respective designated temperature range, the setpoint humidity within a respective designated humidity range, and lead/lag designations for the compressors. Various optimization algorithms are contemplated including evolutionary optimization, gradient descent, or numerical optimization. Further, various bases may be used by container temperature optimization 240 to determine the setpoint temperature, the setpoint humidity, and/or the lead/lag designations. As one example, the container temperature optimization 240 may use a ratio of Battery SOC/MTBF as the figure of merit, with minimization of the ratio as the objective in selecting the setpoint temperature and/or the setpoint humidity.

As another example, the container temperature optimization 240 may determine whether (and how) to designate the compressors as lead/lag. In one or some embodiments, initially, the container temperature optimization 240 may not load the compressors differently. As data points accumulate, the container temperature optimization 240 may command differential loading of the compressors as part of the optimization routine. In particular, the container temperature optimization 240 may determine the differential loading based on any one, any combination, or all of the health indicator (e.g., the current health indicator, one example of which being the current MTBF) of one or both compressors, the maintenance history of one or both compressors, the scheduling timelines of one or both compressors, length of with additional data regarding Mx history, scheduling timelines, or length of service of one or both compressors. In one or some embodiments, the container temperature optimization 240 may select the loading in order to ensure that neither compressor fails. Alternatively, the container temperature optimization 240 may in order to ensure that at least one compressor does not fail. Separate from the container temperature optimization 240 selecting the setpoint temperature, the setpoint humidity, and/or the load(s) for the compressors, the container temperature optimization 240 may further provide notice, such as real-time notice, responsive to its analysis. As one example, responsive to the container temperature optimization 240 determining that the loading of the compressors (e.g., determining that the loading does not decrease MTBF), the container temperature optimization 240 may send a communication (e.g., a real-time communication) indicating that maintenance, such as proactive maintenance, be performed on one or both of the compressors. In one or some embodiments, the communication may be sent to a member of the maintenance team (e.g., an email and/or a mobile phone associated with the member), with the communication indicating any one, any combination, or all of: the specific compressor subject to maintenance; location data of the specific compressor subject to maintenance; or timing for performing the maintenance on the specific compressor (e.g., an indication that maintenance should be performed within a predetermined time period, such as within 1 week).

In one or some embodiments, the container temperature optimization 240 may examine the weights assigned to each of the controllable variables (e.g., each of the setpoint temperature and/or the setpoint humidity and/or loading) and may select alternative weights that conform with predetermined guidelines (e.g., increase MTBS). In this regard, optimal and sub-optimal solutions may both be examined in the optimization space. Various options may be examined for suitability. For example, a first choice may be initially considered optimal (e.g., a highest rise in MTBF for a smallest decrease or a near zero decrease in SoC). If that first choice is not within guidelines (discussed further below), the container temperature optimization 240 may examine sub-optimal solutions, which may be performed iteratively and recursively.

Once the analysis converges, the selected temperature setpoint and/or selected humidity setpoint and/or loading may pass through one or more filters. This is illustrated, for example, at 242, it is determined whether the battery SoC is maintained based on the selected temperature setpoint and/or selected humidity setpoint. If not, the container temperature optimization 240 selects a different temperature setpoint and/or different humidity setpoint and/or different loading (such as no differential loading at all). If yes, at 244, it is determined whether the MTBF is increased. Again, if not, the block diagram 200 loops back to 240 to select a different temperature setpoint and/or different humidity setpoint and/or different loading. Thus, with 242 and 244, the optimization seeks to at least maintain battery SoC at its current level, while increasing the MTBF.

If so, at 250, the recommended setpoint(s) and/or loading are sent to a supervisory control and data acquisition (SCADA) system for the SCADA system to implement. After which, at 252, the cooling temperature setpoint may be determined. In one or some embodiments, the setpoint may be selected based on any one, any combination, or all of: historical anomalies; compressor cycling; or temperature reading(s). At 254, one or more machine safety checks may be implemented. After which, at 256, one or more personal safety checks are implemented. At 258, the setpoint control logger is performed for logging the setpoints, which in turn may trigger a communication at 260 for monitoring or notifying of the setpoints. Thus, a solution, even though not implemented due to failure to comply with one or more of the checks, may be recorded and may optionally be communicated (e.g., via email) to a separate electronic device. Further, the temperature control system, such as the air conditioner(s), may be controlled at 262, which in turn affects the power bank(s) at 264. One example of the power bank may comprise a Battery Energy Storage System (BESS). A BESS is a type of energy storage system that uses a plurality of batteries to store and distribute energy in the form of electricity. Various types of BESS are contemplated, including lithium-ion batteries, lead-acid batteries, redox flow batteries, sodium-sulfur batteries, or zinc-bromine flow batteries. Other types of power bank(s) that are configured to store energy are contemplated. As shown, the power bank(s) 264 may provide input to 210. In one or some embodiments, the input may comprise one or more temperature readings in the power bank(s) 264. For example, the power bank(s) 264 may include multiple temperature sensors, which may indicate a respective power bank with a highest temperature. Thus, in one or some embodiments, the setpoint control may, in practice, be based on the power bank with the highest temperature reading.

The batteries, such as the BESS, may be used in a variety of contexts and for a variety of uses. For example, the BESS may act as reserve energy that may complement the existing grid to serve one or more purposes (e.g., purposes that may have different timescales, such as from milliseconds to hours). Energy input to the BESS may be from any one, any combination, or all of: solar power (e.g., solar panels); wind power (e.g., wind turbines); nuclear power; or any other power generation source. For example, in the context of a mobile system, a plurality of solar panels may generate power that is routed to electrically charge the BESS, which may be housed in one or more containers. Further, the BESS may be used for any one, any combination, or all of the following timescales: the millisecond timescale (e.g., for any one, any combination, or all of: transient voltage stability; harmonic mitigation; or pulsed load and generation spike mitigation); the seconds timescale (e.g., for any one, any combination, or all of: emulated inertia; islanding seamless transition; cold load pick-up during blackstart; or primary frequency control); the minutes timescale (e.g., for any one, any combination, or all of: voltage management; secondary frequency control; renewable energy systems (RES) power swing mitigation; or blackstart); the hours timescale (e.g., for any one, any combination, or all of: load smoothing; energy arbitrage; islanded operation; tertiary frequency control; losses minimization; or congestion management). In this regard, the BESS may be used in a variety of contexts, including for base load to the energy grid.

Thus, the system may perform one or more safety checks, which may be codified in the algorithm, prior to implementing a solution. For example, in one or some embodiments, any one, any combination, or all of the following safety checks may be performed: battery SoC check; compressor MTBF check; one or more machine safety checks; one or more temperature safety checks; or one or more personnel safety checks. By way of example, the battery SoC check may comprise analyzing the selected setpoint(s) to determine whether the battery SoC has been maintained. See 242. Other battery SoC checks are contemplated. As another example, the compressor MTBF check may comprise analyzing the selected setpoint(s) to determine whether the compressor MTBF has been increased. See 244. Other compressor MTBF checks are contemplated. As yet another example, the one or more machine safety checks may comprise one or both of: analyzing the quantum change in setpoint temperature and/or setpoint humidity and/or loading (e.g., whether the change in setpoint temperature is greater than a predetermined amount); analyzing the time change (e.g., whether cycling of temperature and/or humidity and/or loading is greater than a predetermined amount, which may be detrimental to the health of the compressor; whether the oscillation of temperature and/or humidity and/or loading is greater than a predetermined amount, which may also be detrimental to the health of the compressor); analyzing the setpoint temperature (e.g., whether the setpoint temperature is within the recommended range, such as 18-28° C.); analyzing the setpoint humidity (e.g., whether the setpoint humidity is within the recommended range); or analyzing the loading. Thus, with regard to the setpoint temperature, the various checks may be used to ensure that the change in setpoint temperature is not excessive, the oscillations in setpoint temperature are not excessive or not excessively frequent, the setpoint temperature is within the acceptable range, etc.

On balance, there may be a plurality of different solutions that may be considered feasible, with the system applying the different checks in order to select a solution to implement from amongst the feasible solutions. In one or some embodiments, the feasible solutions may be ranked or weighted based on the different checks. By way of example, the solution selected may show the smallest change from the current setpoint, which may take precedence over another feasible solution where the new setpoint results in a greater change from the current setpoint with a minimal increase in MTBF. In this way, the system may combine optimization of Battery SOC and compressor MTBF for joint balanced settings, with the automatic adjustment of the setpoint recommendations being aligned to compressor health and/or to battery health.

Figure 4:
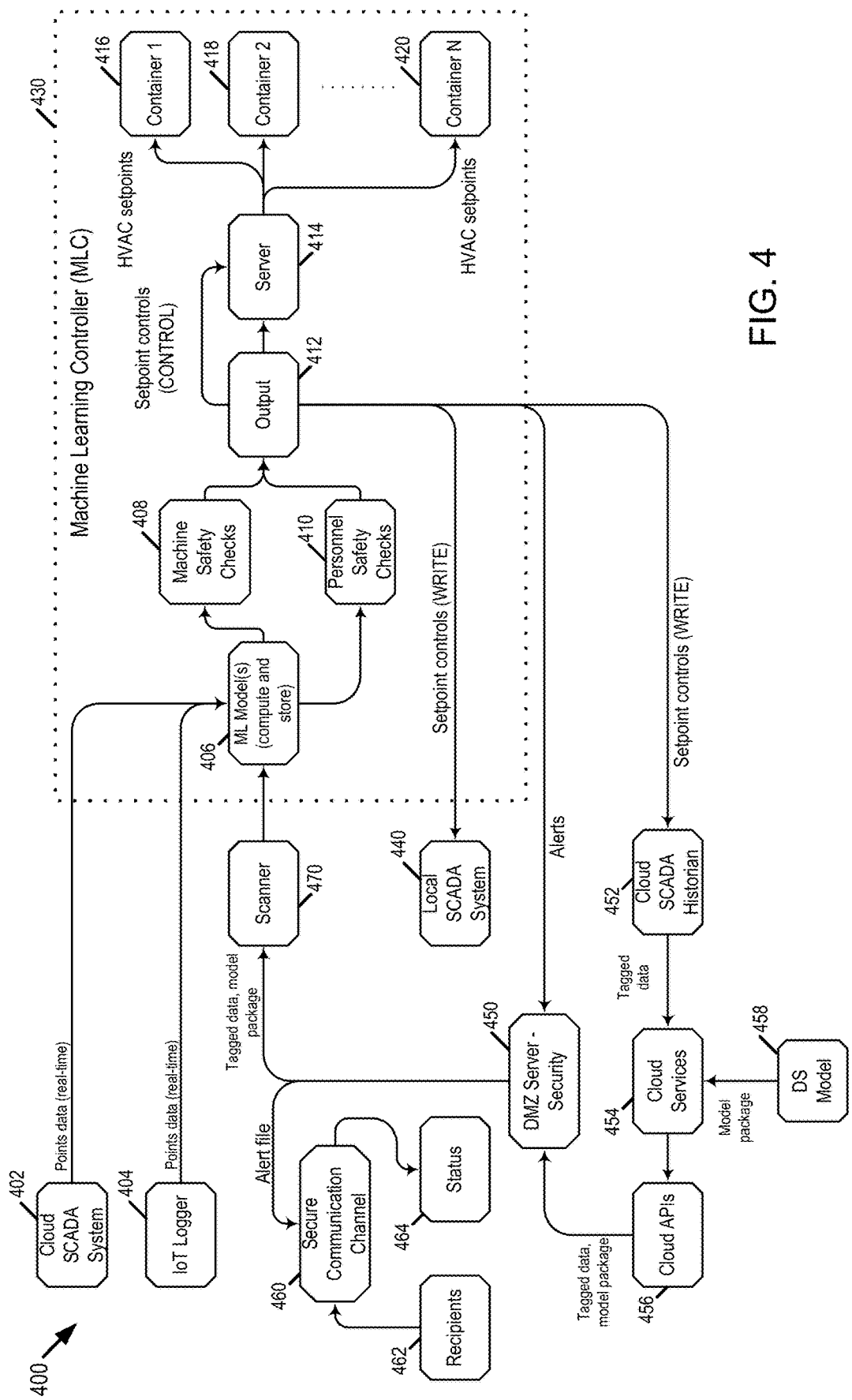
FIG. 4 is a dataflow and communication architecture for determining and controlling the temperature control system.

If the recommended setpoint(s) passed the various checks, the recommended setpoint(s) may be considered a workable solution and the command to implement the recommended setpoint(s) may be implemented. Further, the setpoint recommendations may be considered site agnostic and may further be independent of data source. FIG. 2 may support an iterative process for setpoint(s) recommendation and/or loading recommendation, with near real-time and edge computed control mechanism with cloud and fog interactions, such as illustrated in FIG. 4.

Figure 3A:
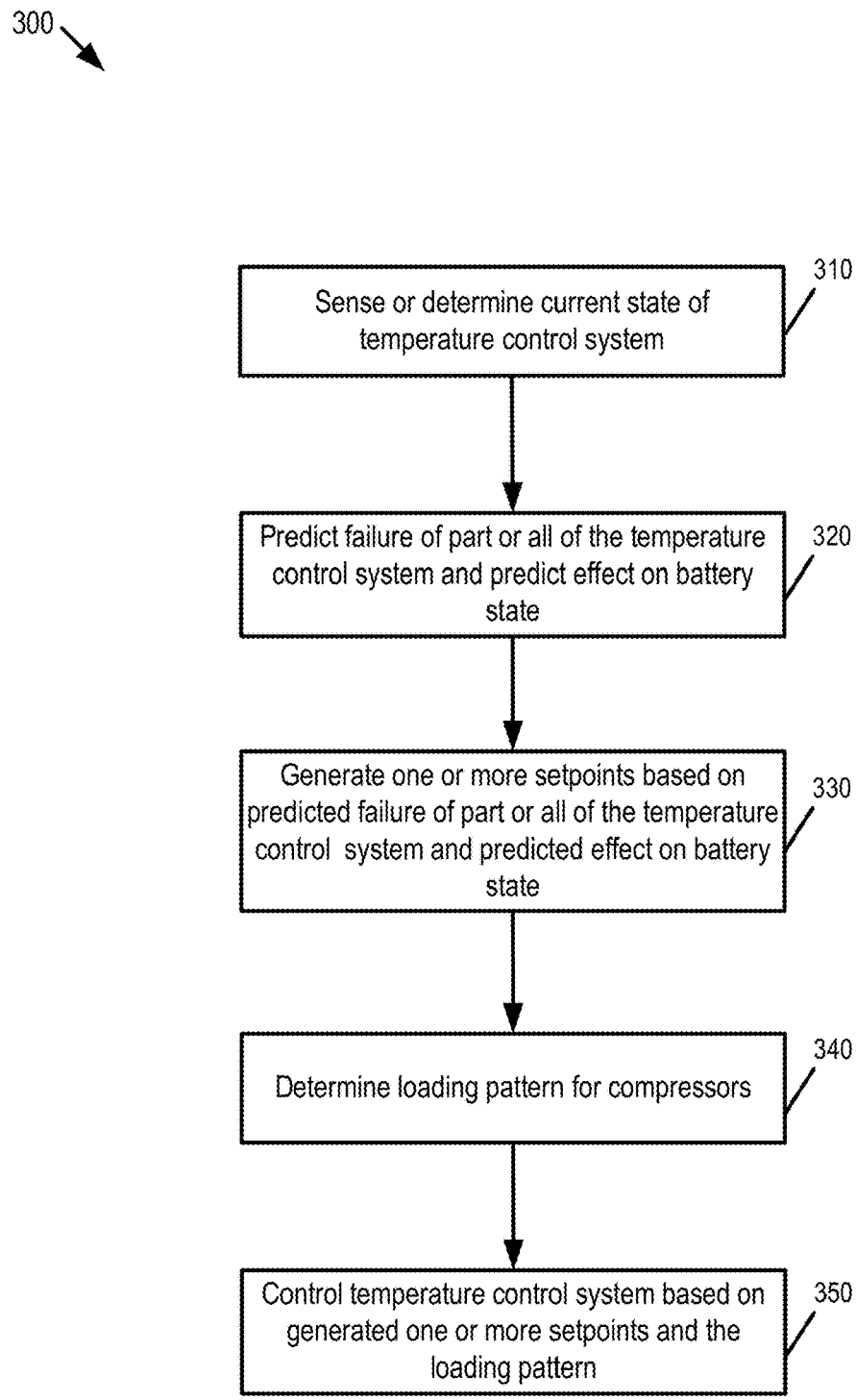
FIG. 3A is a flow diagram for determining and controlling the temperature control system.
Figure 3B:
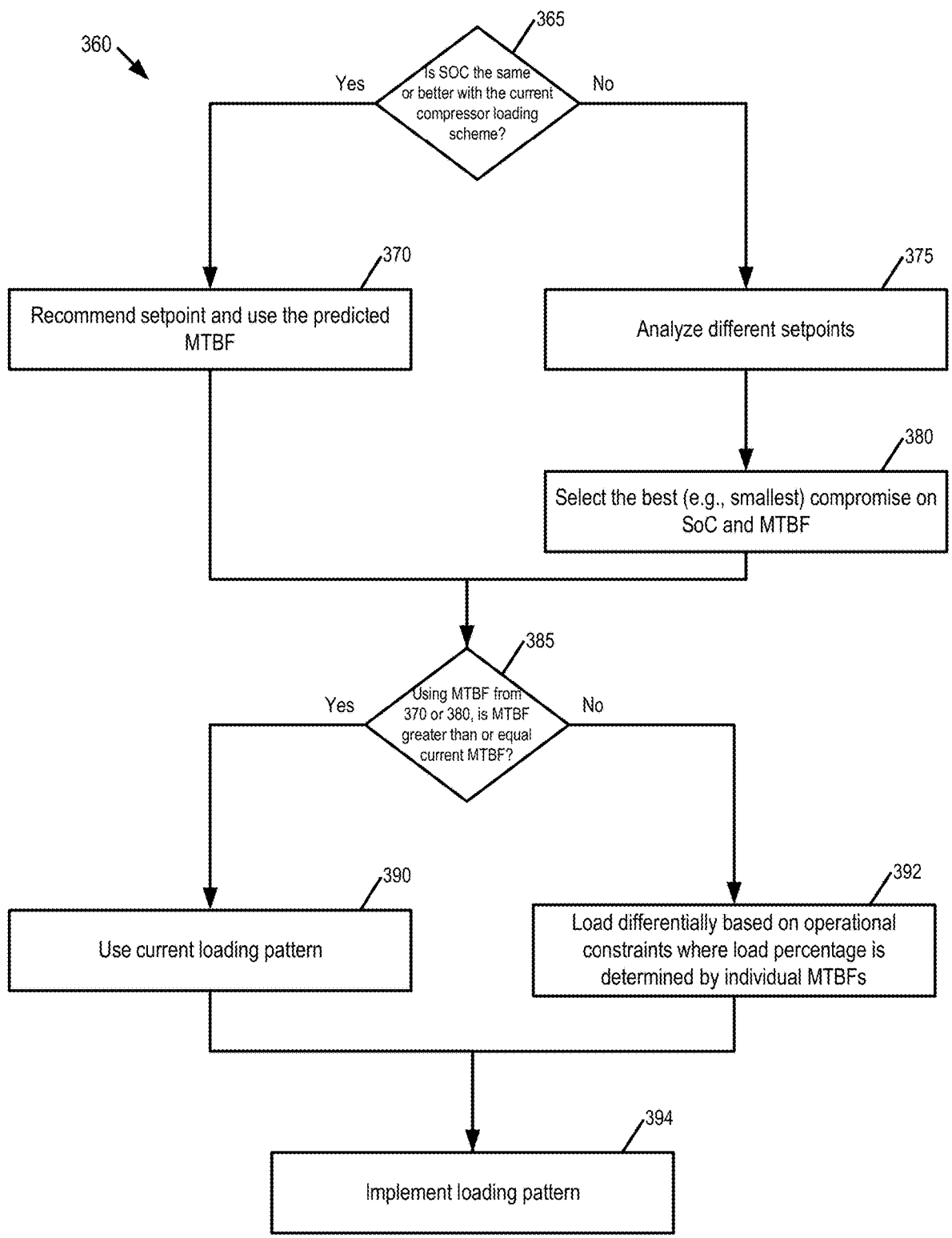
FIG. 3B is a flow diagram for determining and implementing differential loading for the compressors in the temperature control system.

FIG. 3A is a flow diagram 300 for determining and controlling the temperature control system. At 310, the current state of the temperature control system is sensed or determined. For example, various sensors may sense temperature and humidity both inside and outside of the container that houses the batteries, determine the state of one or more parts of the temperature control system (e.g., compressor cycling), determine the anomalies in the temperature control system, etc. At 320, using one or more neural networks, failure of part or all of the temperature control system (e.g., MTBF for the compressors) and effect on the battery state (e.g., battery SoC) is predicted. At 330, one or more setpoints (e.g., temperature setpoint and/or humidity setpoint) are generated based on the predicted failure of part or all of the temperature control system and predicted effect on the battery state. At 340, the loading pattern (e.g., the different loads for the compressors) are determined. An example of this is illustrated in FIG. 3B. At 350, the temperature control system is controlled using the one or more setpoints and the loading pattern.

FIG. 3B is a flow diagram 360 for determining and implementing differential loading for the compressors in the temperature control system. In one or some embodiments, the health of one or both of the compressors are analyzed in order to determine loading. In one example with a two-compressor temperature control system, the MTBF (such as the predicted MTBF) of each of two compressors may be determined. Further, in one or some embodiments, the MTBF may be as high as the worse MTBF compressor in the pair. Alternatively, the MTBF of both compressors may be used (such as averaged) in the analysis.

In one or some embodiments, the container temperature optimization 240 may fine one or more solutions, such as two solutions as illustrated in FIG. 3B. In particular, at 365, the container temperature optimization 240 determines whether the SoC is the same or better with the current loading scheme. If yes, at 370, the container temperature optimization 240 recommend setpoint and use the predicted MTBF. If not, at 375, different setpoints may be analyzed and at 380, the container temperature optimization 240 may recommend the best (e.g., the smallest) compromise on SoC and MTBF. As one example, different implementations may be compared, such as a first potential implementation in which the SoC deteriorates less than a predetermined percentage (e.g., less than 3%) while the MTBF improves by at least a predetermined percentage (such as 5%) with a second potential implementation in which the SoC deteriorates greater than a predetermined percentage (e.g., such as greater than 3%) while the MTBF improves by the at least a predetermined percentage (such as 5%). The evaluation of the different implementation may result in a balancing of the effect on the SoC and on the MTBF in the selection of control of the temperature control system.

Further, at 385, using the MTBF (either from 370 or 380), the container temperature optimization 240 determines whether the MTBF is greater than or equal to the current MTBF (e.g., the MTBF determined in a previous iteration). If yes, at 390, the container temperature optimization 240 uses the current loading pattern (e.g., the loading pattern that was used in a previous iteration, such as the immediately previous iteration). If not, at 392, the container temperature optimization 240 may determine a different loading. As one example, the container temperature optimization 240 may load differentially based on operational constraints (e.g., where the load percentage is determined by the individual MTBFs for the different compressors). After which, at 394, the loading pattern may be implemented.

FIG. 4 is a dataflow and communication architecture 400 for determining and controlling the temperature control system. As discussed above, data as to the state of the system may be obtained in one of several ways. As shown in FIG. 4, data, which may comprise site data, may be obtained by Cloud SCADA System 402, which may provide points data in real time, and Internet of Things (IoT) Logger 404, which may likewise provide points data in real time. It is contemplated that any IoT Logger 404 may be used, including but not limited to: OPC Unified Architecture (OPCUA); Distributed Network Protocol 3 (DNP3); Modbus; and Inter-Control Center Communications (ICCP).

The data may be input to Machine Learning Controller (MLC) 430, which may comprise a PLC-like device and configured as an edge computer with its core purpose being to algorithmically control parameters for the HVAC system. More specifically, the data may be input to one or more ML model(s) 406, which may have previously been trained, computed, and stored. As discussed above, various ML models are contemplated, such as one or both of: one or more ML models used for setpoint recommendations; or anomaly detection model (e.g., fault detection model).

In turn, the ML model(s) 406 may be used to generate one or more setpoint recommendations, which may be fed to machine safety checks 408 and personnel safety checks 410. In one or some embodiments, machine safety checks 408 may include, but is not limited to, industry standard practices that prevent adverse/damaging impact on machinery, such as any one, any combination, or all of: checking for open doors; CO2 protection; fire alarm; etc. Personnel safety checks 410 may include, but is not limited to, standard Lock Out/Tag Out and removal/isolation of potentially dangerous sources of stored energy etc.

After review from the machine safety checks 408 and the personnel safety checks 410, the setpoint(s) are transferred to output 412, which in turn transmits the setpoint controls for control of the one or more containers to server 414 and for logging to one or more systems. In particular, server 414 generates control commands indicative of HVAC setpoints to one or more containers, such as container 1 (416), container 2 (418) to container N (420). As one example, the system may be configured for direct operator-free communication of the recommended setpoint temperature and/or the recommended loading to Modbus for relaying to the one or more containers, thereby allowing for a remote monitoring and governing mechanism.

Further, the setpoint controls may be logged by transmitting to any one, any combination, or all of: local SCADA system 440; cloud SCADA historian 452; or DMZ server-security 450. ML Model(s) 406 may be updated in one of several ways. As one example, data science (DS) model 458 may transmit a model package to cloud services 454. In particular, the DS model 458 may include updates for one or both of the ML model(s) used for setpoint recommendations or the anomaly detection model.

Likewise, cloud SCADA historian 452 may transmit tagged data to cloud services 454. In turn, cloud APIs 456 transfers the tagged data and model package to DMZ server-security 450 in order to update ML model(s) 406 via scanner 470 (e.g., scanner 470 may perform one or more checks on the model package, such as scanning for viruses, etc.). This transfer may be performed periodically, such as weekly. In this way, the ML model(s) 406 may be updated in a non-disruptive manner.

Further, DMZ server-security 450 may transmit an alert file to secure communication channel 460, which may receive input as to recipients 462 (indicating which electronic devices or people are to be notified) and which generate an output as to status 464 to the designated recipients. For example, the DMZ server-security 450 may generate the alert file, which may be sent to the secure communication channel 460, which may disseminate the alert file to those recipients that are designated to receive it.

In one or some embodiments, various parts of FIG. 4 may be based on or use onsite data and other parts may be based on or use cloud data. For example, blocks 402, 404, 406, 408, 410, 412, 414, 416, 418, 420 may be based on or use onsite data, and blocks 440, 450, 452, 454, 456, 458, 460, 462, 464, and 470 may be based on or use cloud data.

As discussed above, anomaly detection may be used as part of the setpoint determination. For example, information regarding the number of anomalies may be useful when recommending the appropriate temperature setpoint for the HVAC system. In one or some embodiments, anomaly detection may be based on machine learning that seeks to identify anomalies in datasets or data streams, such as for sensor faults detection, predictive maintenance, or the like. An anomaly may be defined as an outlier, such as a statistical outlier. Thus, in one or some embodiments, temperature sensor samples, which may be analyzed as a timeseries, may be input to an ML model to identify anomalies.

Figure 5:
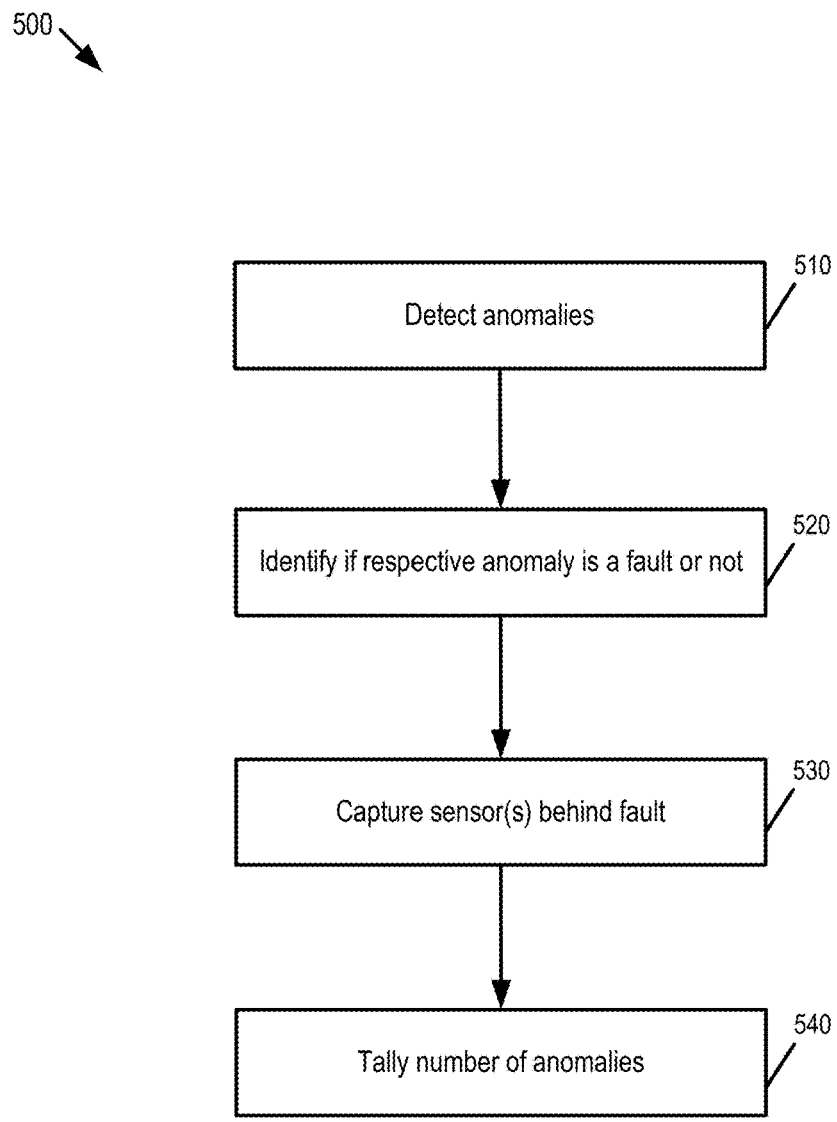
FIG. 5 a flow diagram for determining the number of anomalies in the temperature control system.

FIG. 5 a flow diagram 500 for determining the number of anomalies in the temperature control system. At 510, anomalies are detected. At 520, the respective anomaly is identified as a fault or not. At 530, the one or more sensors behind the fault are captured. And, at 540, the number of anomalies are tallied. As discussed above, one input may comprise the number of anomalies, which may be an indicator of the health of the temperature control system.

As previously mentioned, the number of anomalies may be generated by fault detection model that may use a Principal Component Analysis (PCA) algorithm. PCA may comprise a statistical technique for reducing the dimensionality of a dataset, such as by linearly transforming the data into a new coordinate system where most or all of the variation in the data may be described with fewer dimensions than the initial data. As discussed in more detail below, multiple principal components (which may comprise a collection of points in a real coordinate space as a sequence of p unit vectors) may be used, such as by using the first two principal components in order to plot the data in two dimensions and to visually identify clusters of closely related data points. Thus, PCA may comprise a statistical analysis to indicate if the data indicates that the system is outside the normally acceptable territory, in order to identify faults in one or both of the temperature control system or the battery system, such as the BESS. In practice, the BESS may include or have associated therewith as part of the temperature control system at least thousands of sensors (e.g., at least one thousand sensors; at least two thousand sensors; at least three thousand sensors; at least four thousand sensors; or at least five thousand sensors) for monitoring and/or controlling. The sensors may generate data indicative of physical system measurements, such as the batteries voltage, the batteries current, the batteries temperatures, etc. Given the large number of sensors, an AI/ML solution, based on a PCA algorithm, may be used to track a respective sensor individually, and to detect whether the respective sensor is behaving normally or unsatisfactory in comparison to other sensors with the same function in the system.

As such, the PCA algorithm may group sensors with the same function and may calculate anomalies in their readings, such as any one, any combination, or all of: voltage; current; temperature; or other physical representations of the system's operation. These anomalies may then be evaluated against a threshold to classify them as faults or maintain their designation as anomalies. As discussed above, a higher number of anomalies indicates that the system is operating outside of the normal/acceptable range, while a lower number indicates that the system is healthier.

Further, to validate the detected faults, a signal-to-noise ratio (SNR) process may be used to determine the probability of a fault occurrence. A higher SNR may indicate a higher probability of a fault. Finally, a spectral residuals (SR) analysis may be applied to identify the most likely faulty sensors among the others in the system (e.g., the PCA algorithm may capture the faults in the group, and the SR process may identify which are the individuals who are most likely to have the faults). In this regard, the PCA algorithm, the SNR process, and the SR analysis may be used in combination to identify the number of anomalies.

Figure 6:
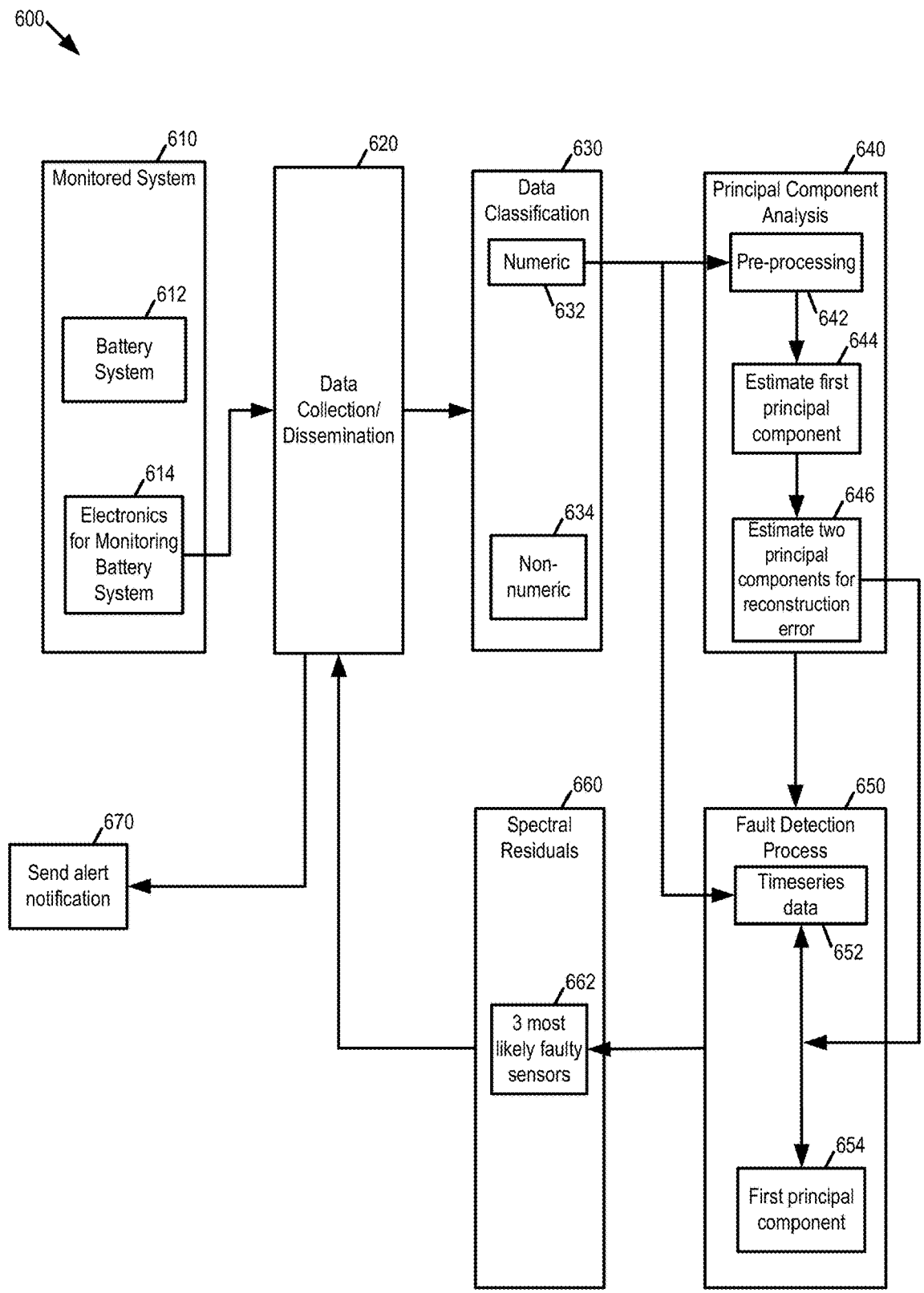
FIG. 6 is a dataflow and communication architecture for determining anomalies in the temperature control system.

FIG. 6 is an example dataflow and communication architecture 600 for determining anomalies in the temperature control system. As discussed above, the number of anomalies may be indicative of future faults in the system and thus may be used as input to predict the battery SoC and/or the MTBF of the compressor(s). In one or some embodiments, an anomaly may be considered a deviation from normal operation. For example, timeseries data (e.g., data over a period of time for respective sensor(s), such as temperature sensors and/or voltage sensors) may be analyzed in order to determine whether the timeseries data is indicative of a deviation from typical or normal timeseries data. Further, a respective anomaly may or may not be a fault (e.g., the anomaly may be a deviation from normal operation or may be indicative of an actual fault).

As discussed above, various metrics may be used in order to characterize the state of the system. In one or some embodiments, the number of anomalies may be indicative of the state of the system, which may be used for further analysis, such as indicated in FIG. 2. In one or some embodiments, a predetermined number of anomalies may be indicative of a fault. In one embodiment, the predetermined number may be determined by one or more neural networks, such as first neural network 230 and/or second neural network 232. Alternatively, or in addition, the predetermined number may be based on user input.

Further, in one or some embodiments, the number of anomalies may comprise a single number (e.g., a total number of anomalies in the system, such as the addition of the anomalies for temperature sensors, the anomalies for voltage sensors, etc.) and may be compared with a single predetermined number to indicate whether a fault is present. Alternatively, the number of anomalies may comprise multiple numbers (e.g., a first number of anomalies for the temperature sensors; a second number of anomalies for the voltage sensors; etc.) with each of the multiple numbers being compared to a respective predetermined number to determine a fault. In this way, a first type of anomalies (e.g., based on temperature sensor anomalies) and a second type of anomalies (e.g., based on voltage sensor anomalies) may both be considered. In one or some embodiments, the respective predetermined number may be the same (e.g., the same predetermined number may be used to compare against the first number of anomalies for the temperature sensors and to compare against the second number of anomalies for the voltage sensors). Alternatively, different respective predetermined numbers may be used (e.g., the number of the first type of anomalies is compared with the first predetermined number in order to determine whether the first type of fault has occurred or will occur; the number of the second type of anomalies is compared with the second predetermined number in order to determine whether the second type of fault has occurred or will occur). As one example, the predetermined number for temperature sensors may comprise 1,000 anomalies, meaning that the first number of anomalies for the temperature sensors being greater than 1,000 is indicative of a fault. As another example, the predetermined number for voltage sensors may comprise 100 anomalies, meaning that the second number of anomalies for the voltage sensors being greater than 100 is indicative of a fault. In this regard, the number of anomalies may be based on the subpart of the system subject to the anomalies, such as based on the type of sensor subject to the anomalies, and may be input to the one or more neural networks. In turn, the one or more neural networks may predict the effect on the battery state indicator and/or the effect on the temperature control system reliability indicator based on determining whether the first type of fault has occurred or will occur and based on determining whether the second type of fault has occurred or will occur.

Further, in one or some embodiments, the predetermined number of anomalies (indicating a fault) may be constant (and unvarying over time). Alternatively, the predetermined number of anomalies (indicating a fault) may vary over time. For example, one or more neural networks may determine the predetermined number of anomalies based on the state of the system (e.g., the age of the sensors, etc.). In this regard, the predetermined number of anomalies, used to trigger an indication of a fault, may change based on the state of the system. Alternatively, or in addition, trends may be used to determine an indication of fault. For example, separate from (or instead of) comparing the number of anomalies to the predetermined number of anomalies to determine an indication of a fault, the system may analyze trend(s) in the number of anomalies. In particular, an increasing number of anomalies may be indicative of an increasing deviation from normal (e.g., deviation from optimal operation) and may further be indicative of a nascent or upcoming fault. In this regard, the neural networks, such as first neural network 230 and/or second neural network 232, may analyze the trend(s) in the analysis as to whether a fault is present or upcoming.

Monitored system 610 may include battery system 612 and the electronics for monitoring the battery system 614. In one or some embodiments, the electronics for monitoring the battery system 614 may comprise one or more sensors configured to generate data indicative of voltages, currents, temperatures, or other physical representations of the system's operation, such as with regard to the battery or the container. The data may be transmitted to data collection/dissemination 620, which may be configured to collect and store the data, and to transmit the data to data classification 630. In turn, data classification 630 may classify the data into numeric 632 and non-numeric 634.

As shown in FIG. 6, the numeric data may be transmitted to PCA 640 for pre-preprocessing 642 (which may filter and/or clean the incoming numeric data). In turn, at 644, the first principal component may be estimated, and at 646, the two principal components for reconstruction error may be estimated. In one or some embodiments, PCA may comprise computing the principal components and using them to perform a change of basis on the data. In the data analysis, the first principal component of a set of p variables, which may be jointly normally distributed, may be the derived variable formed as a linear combination of the original variables that explains the most variance. The second principal component may explain the most variance in what is left once the effect of the first principal component is removed (e.g., proceeding through a number of iterations until all the variance may be explained). In this regard, the first principal component may equivalently be defined as a direction that maximizes the variance of the projected data. Further, the second principal component may be taken as a direction orthogonal to the first principal component that maximizes the variance of the projected data. Further, in one or some embodiments, PCA may comprise an orthogonal linear transformation that transforms the data to a new coordinate system such that the greatest variance by some scalar projection of the data comes to lie on the first principal component, the second greatest variance on the second principal component, etc.

The output of the analysis of the PCA 640 may be input to the fault detection process 650, which may analyze timeseries data 652. As discussed above, various timeseries data may be analyzed, such as timeseries data regarding voltage sensor outputs and/or temperature sensor outputs. In one or some embodiments, PCA 640 may be configured to extract information from the numeric data, which may find the directions of significant variability in the numeric data by forming linear combinations of variables. Further, the fault detection process 650 may analyze the first principal component 654.

Thereafter, spectral residuals 660 may be performed. In one or some embodiments, spectral residuals 660 may comprise a model to detect the anomalies by using the computer vision on the timeseries data. In one or some embodiments, spectral residuals 660 may: apply the spectral residuals to create the saliency map; and detect the anomalies over the timeseries data. In particular, the spectral residuals 660 may identify the three most likely faulty sensors 662. Other numbers of likely faulty sensors are contemplated. After which, spectral residuals 660 may transmit the results of the analysis to data collection/dissemination 620 for recording. Finally, data collection/dissemination

620 may, responsive to review of the data received from spectral residuals 660, send an alert notification at 670.

Figure 7:
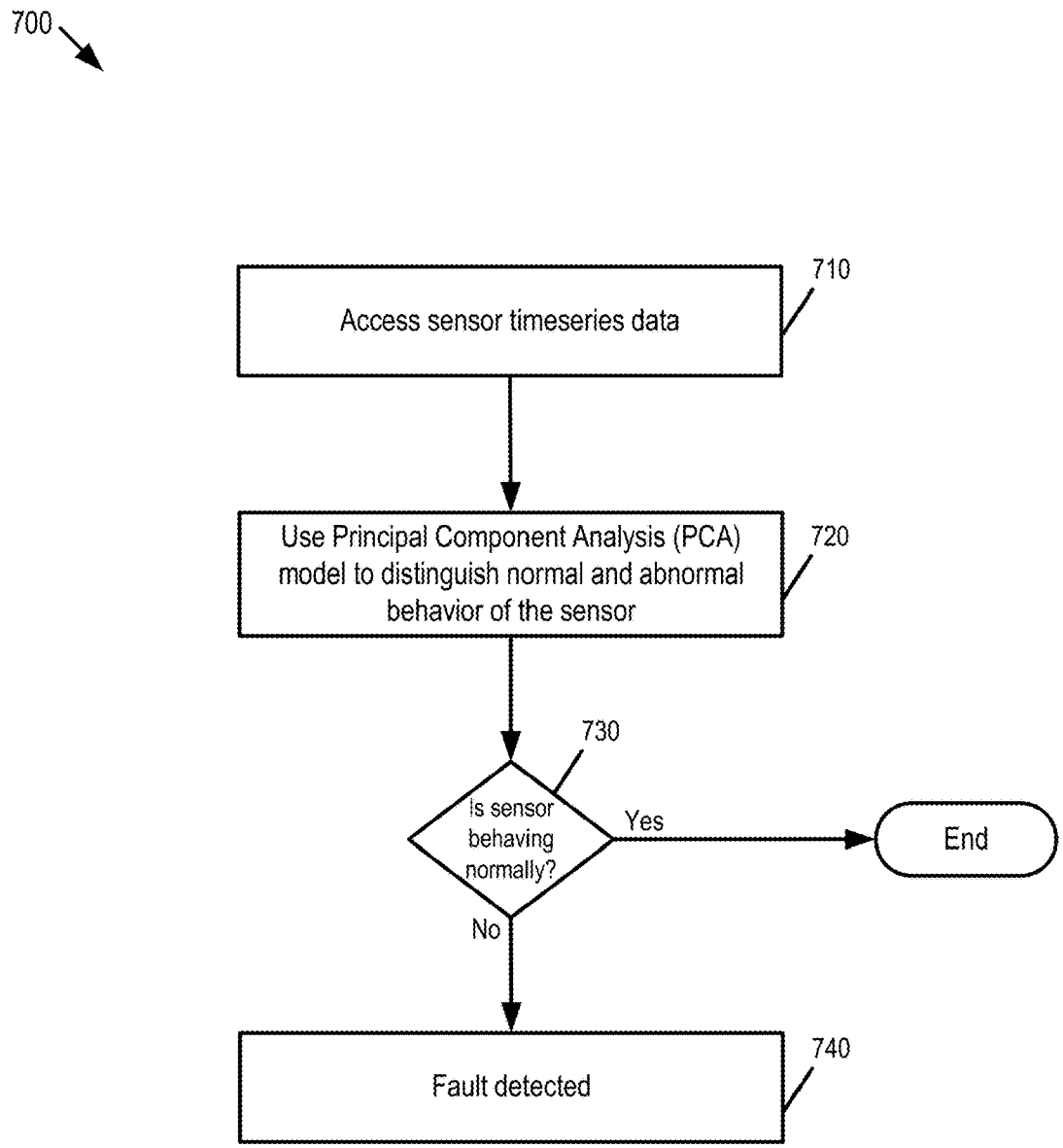
FIG. 7 is a flow diagram for determining whether a fault is detected in the temperature control system.

Various methods may be used to identify or detect a fault, such as shown in FIG. 7, which is a flow diagram 700 for determining whether a fault is detected in the temperature control system. At 710, the sensor timeseries data for a respective sensor is accessed. At 720, a PCA model is used to distinguish normal and abnormal behavior of the respective sensor. Based on the PCA model, at 730, it is determined whether the respective sensor is behaving normally. If so, flow diagram 700 ends. If not, at 740, a fault is detected in the respective sensor. Further, as discussed above, after the fault is detected in the respective sensor, additional analysis is performed to determine whether the fault is considered an anomaly, since not every fault may be considered an anomaly.

In all practical applications, the present technological advancement must be used in conjunction with a computer, programmed in accordance with the disclosures herein. Merely by way of example, various devices disclosed in the present application may comprise a computer or may work in combination with a computer (e.g., executed by a computer), such as, for example, in block diagrams 1-2 or 6 or in flow diagrams 3-5 and 7. Merely by way of example, computing functionality may be manifested in the one or more neural networks 110, container control parameter selection 120, compressor controller(s) 130, or the like. As such, computing functionality may be resident within any of the electronic devices discussed herein.

Figure 8:
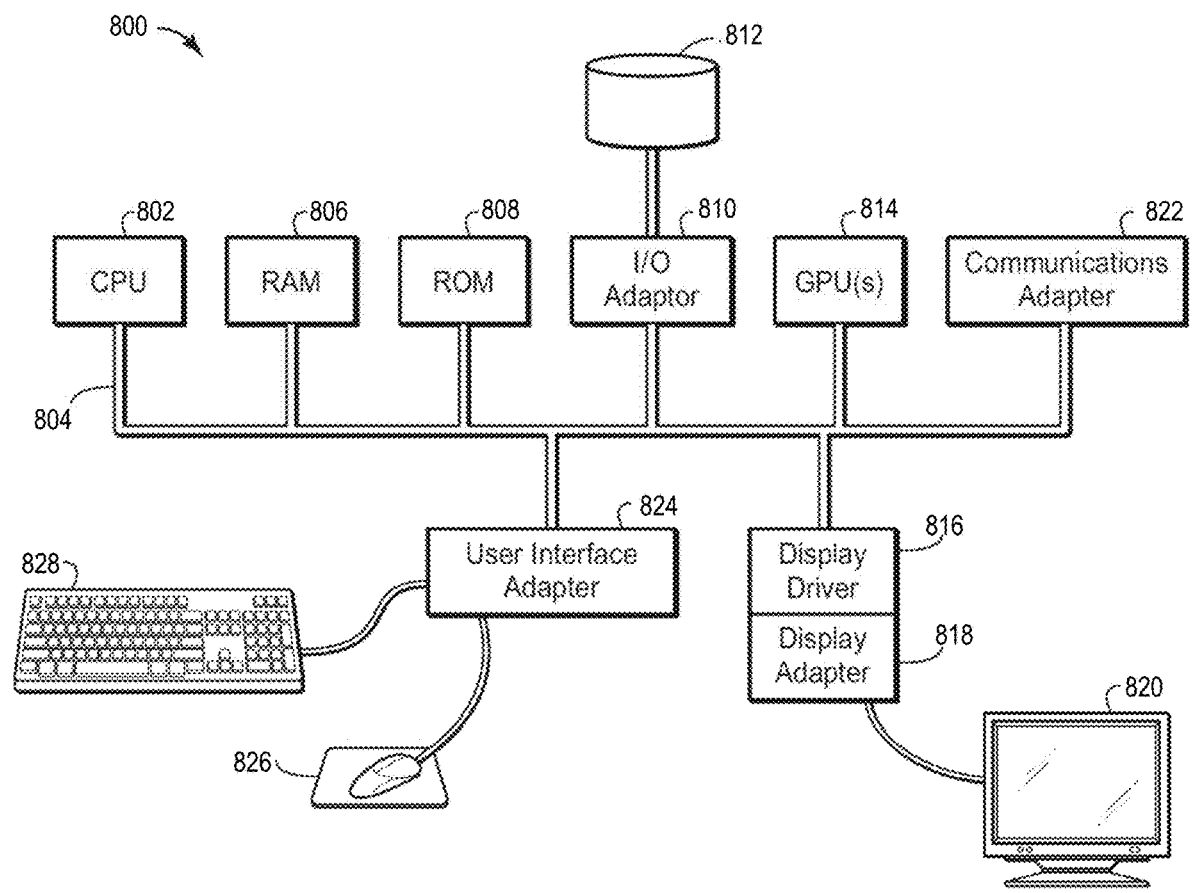
FIG. 8 is a diagram of an exemplary computer system that may be utilized to implement the methods described herein.

FIG. 8 is a diagram of an exemplary computer system 800 that may be utilized to implement methods, including the flow diagrams, described herein. A central processing unit (CPU) 802 is coupled to system bus 804. The CPU 802 may be any general-purpose CPU, although other types of architectures of CPU 802 (or other components of exemplary computer system 800) may be used as long as CPU 802 (and other components of computer system 800) supports the operations as described herein. Those of ordinary skill in the art will appreciate that, while only a single CPU 802 is shown in FIG. 8, additional CPUs may be present. Moreover, the computer system 800 may comprise a networked, multi-processor computer system that may include a hybrid parallel CPU/GPU system. The CPU 802 may execute the various logical instructions according to various teachings disclosed herein. For example, the CPU 802 may execute machine-level instructions for performing processing according to the operational flow described herein.

The computer system 800 may also include computer components such as non-transitory, computer-readable media. Examples of computer-readable media include computer-readable non-transitory storage media, such as a random-access memory (RAM) 806, which may be SRAM, DRAM, SDRAM, or the like. The computer system 800 may also include additional non-transitory, computer-readable storage media such as a read-only memory (ROM) 808, which may be PROM, EPROM, EEPROM, or the like. RAM 806 and ROM 808 hold user and system data and programs, as is known in the art. In this regard, computer-readable media may comprise executable instructions to perform any one, any combination, or all of the blocks in the flow charts in FIGS. 3A-5 and 7. The computer system 800 may also include an input/output (I/O) adapter 810, a graphics processing unit (GPU) 814, a communications adapter 822 (e.g., a communication interface), a user interface adapter 824, a display driver 816, and a display adapter 818.

The I/O adapter 810 may connect additional non-transitory, computer-readable media such as storage device(s) 812, including, for example, a hard drive, a compact disc (CD) drive, a floppy disk drive, a tape drive, and the like to computer system 800. The storage device(s) may be used when RAM 806 is insufficient for the memory requirements associated with storing data for operations of the present techniques. The data storage of the computer system 800 may be used for storing information and/or other data used or generated as disclosed herein. For example, storage device(s) 812 may be used to store configuration information or additional plug-ins in accordance with the present techniques. Further, user interface adapter 824 couples user input devices, such as a keyboard 828, a pointing device 826 and/or output devices to the computer system 800. The display adapter 818 is driven by the CPU 802 to control the display on a display device 820 to, for example, present information to the user such as images generated according to methods described herein.

The architecture of computer system 800 may be varied as desired. For example, any suitable processor-based device may be used, including without limitation personal computers, laptop computers, computer workstations, and multi-processor servers. Moreover, the present technological advancement may be implemented on application specific integrated circuits (ASICs) or very large scale integrated (VLSI) circuits. In fact, persons of ordinary skill in the art may use any number of suitable hardware structures capable of executing logical operations according to the present technological advancement. The term "processing circuit" encompasses a hardware processor (such as those found in the hardware devices noted above), ASICs, and VLSI circuits. Input data to the computer system 800 may include various plug-ins and library files. Input data may additionally include configuration information.

It is intended that the foregoing detailed description be understood as an illustration of selected forms that the invention can take and not as a definition of the invention. It is only the following claims, including all equivalents which are intended to define the scope of the claimed invention. Further, it should be noted that any aspect of any of the preferred embodiments described herein may be used alone or in combination with one another. Finally, persons skilled in the art will readily recognize that in preferred implementation, some, or all of the steps in the disclosed method are performed using a computer so that the methodology is computer implemented. In such cases, the resulting models discussed herein may be downloaded or saved to computer storage.

The following example embodiments of the invention are also disclosed:

Embodiment 1

1. A control system configured to control a temperature control system, the temperature control system configured to control one or both of temperature or humidity for batteries in a space, the control system comprising:
 a communication interface; and
 at least one controller in communication with the communication interface and configured to:
  access a battery state indicator indicative of a state of at least one aspect of the batteries;
  access a temperature control system reliability indicator indicative of reliability of at least one aspect of the temperature control system;

determine, based on the one or more inputs, one or both of setpoint temperature or setpoint humidity based on a combined analysis of an effect on the battery state indicator and the temperature control system reliability indicator; and send one or more controls, indicative of the one or both the setpoint temperature or the setpoint humidity, via the communication interface to the temperature control system so that the temperature control system to control the space based on the one or both of the setpoint temperature or the setpoint humidity.

Embodiment 2

The control system of embodiment 1:
wherein the at least one controller is configured to determine the one or both of the setpoint temperature or the setpoint humidity by:
inputting the one or more inputs to one or more neural networks, the one or more neural networks configured to predict an effect on the battery state indicator and an effect on the temperature control system reliability indicator; and
selecting the one or both of the setpoint temperature or setpoint humidity using a container temperature or humidity optimizer.

Embodiment 3

The control system of embodiments 1 or 2:
wherein the one or more neural networks comprise:
a first neural network configured to output the predicted effect on the temperature control system reliability indicator; and
a second neural network configured to output the predicted effect on the battery state indicator.

Embodiment 4

The control of any of embodiments 1-3:
wherein the temperature control system reliability indicator comprises a predicted indicator regarding one or more compressors in the temperature control system.

Embodiment 5

The control system of any of embodiments 1-4:
wherein the predicted indicator regarding one or more compressors in the temperature control system comprises a predicted mean time between failures (MTBF) for the one or more compressors.

Embodiment 6

The control system of any of embodiments 1-5:
wherein predicted effect on the battery state indicator comprises an estimated effect on the battery state of charge (SoC).

Embodiment 7

The control system of any of embodiments 1-6:
wherein the at least one controller is configured to select the one or both of the setpoint temperature or setpoint humidity using the container temperature or humidity optimizer by:

inputting the predicted effect on the temperature control system reliability indicator and the predicted effect on the battery state indicator to the container temperature or humidity optimizer in order for the container temperature or humidity optimizer to generate a plurality of solutions indicative of different setpoint temperatures or setpoint humidities for controlling the temperature control system; and evaluating the plurality of solutions based on both the temperature control system reliability indicator and the predicted effect on the battery state indicator.

Embodiment 8

The control system of any of embodiments 1-7:
wherein the at least one controller is configured to evaluate the plurality of solutions based on both the temperature control system reliability indicator and the predicted effect on the battery state indicator by evaluating whether a respective solution improves one or both of the temperature control system reliability indicator and the predicted effect on the battery state indicator.

Embodiment 9

The control system of any of embodiments 1-8:
wherein the at least one controller is configured to evaluate whether the respective solution improves the temperature control system reliability indicator and whether the respective solution at least maintains the predicted effect on the battery state indicator.

Embodiment 10

The control system of any of embodiments 1-9:
wherein the temperature control system reliability indicator comprises a predicted mean time between failures (MTBF) for one or more compressors in the temperature control system;
wherein the predicted effect on the battery state indicator comprises a battery state of charge (SoC); and
wherein the at least one controller is configured to evaluate whether the respective solution improves the MTBF and whether the respective solution at least maintains the battery SoC.

Embodiment 11

The control system of any of embodiments 1-10:
wherein the temperature control system comprises a plurality of compressors; and
wherein the MTBF is indicative of an amalgam of the plurality of compressors.

Embodiment 12

The control system of any of embodiments 1-11:
wherein the one or more neural networks are configured to input an anomaly indicator indicative of one or more failures in the temperature control system; and
wherein the one or more neural networks are configured to use the anomaly indicator in order to predict the effect on the battery state indicator and the effect on the temperature control system reliability indicator.

Embodiment 13

The control system of any of embodiments 1-12:
wherein the anomaly indicator is indicative of a number of anomalies in the temperature control system.

Embodiment 14

The control system of any of embodiments 1-13:
further comprising an anomaly detection model configured to determine the number of anomalies in the temperature control system.

Embodiment 15

The control system of any of embodiments 1-14:
wherein the anomaly detection model comprises Principal Component Analysis (PCA) algorithm configured to indicate faults in the temperature control system, a signal-to-noise ratio (SNR) process configured to determine a probability of a fault occurrence for the indicated faults, and a spectral residuals (SR) analysis configured to identify one or more most likely faulty components in the temperature control system based on the probability of the fault occurrence.

Embodiment 16

The control system of any of embodiments 1-15:
wherein the anomaly detection model is configured to determine a number of a first type of anomalies in the temperature control system and a number of a second type of anomalies in the temperature control system, the first type of anomalies being indicative of a first type of fault, the second type of anomalies being indicative of a second type of fault, the first type of fault being different from the second type of fault; and
wherein the one or more neural networks are configured to input the number of the first type of anomalies in the temperature control system and the number of the second type of anomalies in the temperature control system; and
wherein the one or more neural networks are configured to use the number of the first type of anomalies and the number of the second type of anomalies in order to predict the effect on the battery state indicator and the effect on the temperature control system reliability indicator.

Embodiment 17

The control system of any of embodiments 1-16:
wherein the one or more neural networks are further configured to:
determine a first predetermined number of anomalies;
determine a second predetermined number of anomalies;
compare the number of the first type of anomalies with the first predetermined number in order to determine whether the first type of fault has occurred or will occur;
compare the number of the second type of anomalies with the second predetermined number in order to determine whether the second type of fault has occurred or will occur; and
predict the effect on the battery state indicator and the effect on the temperature control system reliability indicator based on determining whether the first type of fault has occurred or will occur and based on determining whether the second type of fault has occurred or will occur.

Embodiment 18

The control system of any of embodiments 1-17:
wherein the one or more neural networks are further configured to input temperature inside a container housing the batteries, temperature outside of the container, humidity inside the container housing the batteries, humidity outside of the container, battery state of charge (SoC) and compressor cycling.

Embodiment 19

The control system of any of embodiments 1-18:
wherein the one or more neural networks comprise:
a first neural network configured to output the predicted effect on the temperature control system reliability indicator;
a second neural network configured to output the predicted effect on the battery state indicator;
wherein the first neural network is configured to input the battery SoC; and
wherein the second neural network is configured to input the compressor cycling.

Embodiment 20

The control system of any of embodiments 1-19:
wherein the batteries are housed within a container in power banks;
wherein the container comprises a plurality of temperature sensors configured to generate sensor data;
wherein the at least one controller is configured to select a respective one of the plurality of temperature sensors based on analysis of reliability of the respective one of the plurality of temperature sensors and based on the respective one of the plurality of temperature sensors sensing a most problematic power bank of the batteries within the container.

Embodiment 21

The control system of any of embodiments 1-20:
wherein the temperature control system comprises a plurality of compressors; and
wherein the at least one controller is further configured to determine differential loading of the plurality of compressors.

Embodiment 22

The control system of any of embodiments 1-21:
wherein the at least one controller is configured to determine differential loading of the plurality of compressors responsive to determining sufficiency to perform the determination of the differential loading.

Embodiment 23

The control system of any of embodiments 1-22:
wherein the at least one controller configured to determine differential loading of the plurality of compressors based on: a health indicator of one or both of the plurality of compressors; and at least one aspect of the one or both of the plurality of compressors.

Embodiment 24

The control system of any of embodiments 1-23:
wherein the at least one aspect of the one or both of the plurality of compressors comprises one or more of compressor cycling, compressor operation history or maintenance, or previous compressor lead/lag operation.

Embodiment 25

The control system of any of embodiments 1-24:
wherein the at least one controller is configured to dynamically determine the differential loading of the plurality of compressors.

Embodiment 26

The control system of any of embodiments 1-25:
wherein the at least one controller is configured to dynamically determine the differential loading of the plurality of compressors based on input indicative of one or both of maintenance scheduling or budgetary information.

Embodiment 27

A computer-implemented method of performing the functions in any combination or order as described in any of embodiments 1-26.

Embodiment 28

A system comprising:
a processor; and
a non-transitory machine-readable medium comprising instructions that, when executed by the processor, cause a computing system to perform a method according to embodiment 26.

What is claimed is:

1. A control system configured to control a temperature control system, the temperature control system configured to control one or both of temperature or humidity for batteries used in a container, wherein the batteries have at least one associated temperature range for operation or at least one associated humidity range for the operation, the control system comprising:
a communication interface; and
at least one controller in communication with the communication interface and configured to:
access a battery state indicator indicative of a state of at least one aspect of the batteries;
access a temperature control system reliability indicator indicative of reliability of at least one aspect of the temperature control system;
determine one or both of setpoint temperature that is selected to be within the at least one associated temperature range or setpoint humidity that is selected to be within the at least one associated humidity range based on a combined analysis of a predicted effect on the battery state indicator of controlling the container at the one or both of the setpoint temperature or the setpoint humidity and a predicted effect on the temperature control system reliability indicator in operating the temperature control system at the one or both of the setpoint temperature or the setpoint humidity; and
send one or more controls, indicative of the one or both the setpoint temperature or the setpoint humidity, via the communication interface to the temperature control system so that the temperature control system to control the container based on the one or both of the setpoint temperature or the setpoint humidity for the operation of the batteries in the container.

2. The control system of claim 1, wherein the at least one controller is configured to determine the one or both of the setpoint temperature or the setpoint humidity by:
inputting one or more inputs to one or more neural networks, the one or more neural networks configured to generate the predicted effect on the battery state indicator and the predicted effect on the temperature control system reliability indicator; and
selecting the one or both of the setpoint temperature or setpoint humidity using a container temperature or humidity optimizer.

3. The control system of claim 2, wherein the one or more neural networks comprise:
a first neural network configured to output the predicted effect on the temperature control system reliability indicator; and
a second neural network configured to output the predicted effect on the battery state indicator.

4. The control system of claim 3, wherein the temperature control system reliability indicator comprises a predicted indicator regarding one or more compressors in the temperature control system.

5. The control system of claim 4, wherein the predicted indicator regarding one or more compressors in the temperature control system comprises a predicted mean time between failures (MTBF) for the one or more compressors.

6. The control system of claim 3, wherein the predicted effect on the battery state indicator comprises an estimated effect on a battery state of charge (SoC).

7. The control system of claim 3, wherein the at least one controller is configured to select the one or both of the setpoint temperature or setpoint humidity using the container temperature or humidity optimizer by:
inputting the predicted effect on the temperature control system reliability indicator and the predicted effect on the battery state indicator to the container temperature or humidity optimizer in order for the container temperature or humidity optimizer to generate a plurality of solutions indicative of different setpoint temperatures or setpoint humidities for controlling the temperature control system; and
evaluating the plurality of solutions based on both the temperature control system reliability indicator and the predicted effect on the battery state indicator.

8. The control system of claim 7, wherein the at least one controller is configured to evaluate the plurality of solutions based on both the temperature control system reliability indicator and the predicted effect on the battery state indicator by evaluating whether a respective solution improves one or both of the temperature control system reliability indicator and the predicted effect on the battery state indicator.

9. The control system of claim 8, wherein the at least one controller is configured to evaluate whether the respective solution improves the temperature control system reliability indicator and whether the respective solution at least maintains the predicted effect on the battery state indicator.

10. The control system of claim 9, wherein the temperature control system reliability indicator comprises a predicted mean time between failures (MTBF) for one or more compressors in the temperature control system;
- wherein the predicted effect on the battery state indicator comprises a battery state of charge (SoC); and
- wherein the at least one controller is configured to evaluate whether the respective solution improves the MTBF and whether the respective solution at least maintains the battery SoC.

11. The control system of claim 2, wherein the one or more neural networks are configured to input an anomaly indicator indicative of one or more failures in the temperature control system; and
- wherein the one or more neural networks are configured to use the anomaly indicator in order to generate the predicted effect on the battery state indicator and the predicted effect on the temperature control system reliability indicator.

12. The control system of claim 11, wherein the anomaly indicator is indicative of a number of anomalies in the temperature control system.

13. The control system of claim 12, further comprising an anomaly detection model configured to determine the number of anomalies in the temperature control system.

14. The control system of claim 13, wherein the anomaly detection model comprises Principal Component Analysis (PCA) algorithm configured to indicate faults in the temperature control system, a signal-to-noise ratio (SNR) process configured to determine a probability of a fault occurrence for the indicated faults, and a spectral residuals (SR) analysis configured to identify one or more most likely faulty components in the temperature control system based on the probability of the fault occurrence.

15. The control system of claim 13, wherein the anomaly detection model is configured to determine a number of a first type of anomalies in the temperature control system and a number of a second type of anomalies in the temperature control system, the first type of anomalies being indicative of a first type of fault, the second type of anomalies being indicative of a second type of fault, the first type of fault being different from the second type of fault; and
- wherein the one or more neural networks are configured to input the number of the first type of anomalies in the temperature control system and the number of the second type of anomalies in the temperature control system; and
- wherein the one or more neural networks are configured to use the number of the first type of anomalies and the number of the second type of anomalies in order to predict generate the predicted effect on the battery state indicator and the predicted effect on the temperature control system reliability indicator.

16. The control system of claim 15, wherein the one or more neural networks are further configured to:
- determine a first predetermined number of anomalies;
- determine a second predetermined number of anomalies;
- compare the number of the first type of anomalies with the first predetermined number in order to determine whether the first type of fault has occurred or will occur;
- compare the number of the second type of anomalies with the second predetermined number in order to determine whether the second type of fault has occurred or will occur; and
- generate the predicted effect on the battery state indicator and the predicted effect on the temperature control system reliability indicator based on determining whether the first type of fault has occurred or will occur and based on determining whether the second type of fault has occurred or will occur.

17. The control system of claim 11, wherein the one or more neural networks are further configured to input temperature inside the container housing the batteries, temperature outside of the container, humidity inside the container housing the batteries, humidity outside of the container, battery state of charge (SoC) and compressor cycling.

18. The control system of claim 17, wherein the one or more neural networks comprise:
- a first neural network configured to output the predicted effect on the temperature control system reliability indicator;
- a second neural network configured to output the predicted effect on the battery state indicator;
- wherein the first neural network is configured to input the battery SoC; and
- wherein the second neural network is configured to input the compressor cycling.

19. The control system of claim 1, wherein the batteries are housed within the container in power banks;
- wherein the container comprises a plurality of temperature sensors configured to generate sensor data;
- wherein the at least one controller is configured to select a respective one of the plurality of temperature sensors based on analysis of reliability of the respective one of the plurality of temperature sensors and based on the respective one of the plurality of temperature sensors sensing a most problematic power bank of the batteries within the container.

20. The control system of claim 1, wherein the temperature control system comprises a plurality of compressors; and
- wherein the at least one controller is further configured to determine differential loading of the plurality of compressors.

21. The control system of claim 20, wherein the at least one controller is configured to determine differential loading of the plurality of compressors responsive to determining sufficiency to perform the determination of the differential loading.

22. The control system of claim 20, wherein the at least one controller configured to determine differential loading of the plurality of compressors based on: a health indicator of one or both of the plurality of compressors; and at least one aspect of the one or both of the plurality of compressors.

23. The control system of claim 22, wherein the at least one aspect of the one or both of the plurality of compressors comprises one or more of compressor cycling, compressor operation history or maintenance, or previous compressor lead/lag operation.

24. The control system of claim 22, wherein the at least one controller is configured to dynamically determine the differential loading of the plurality of compressors.

25. The control system of claim 24, wherein the at least one controller is configured to dynamically determine the differential loading of the plurality of compressors based on input indicative of one or both of maintenance scheduling or budgetary information.

26. A method for controlling a temperature control system, the temperature control system configured to control one or both of temperature or humidity for batteries used in a container, wherein the batteries have at least one associated temperature range for operation or at least one associated humidity range for the operation, the method comprising:

accessing, using at least one controller, a battery state indicator indicative of a state of at least one aspect of the batteries;

accessing, using the at least one controller, a temperature control system reliability indicator indicative of reliability of at least one aspect of the temperature control system;

determining, using the at least one controller, one or both of setpoint temperature that is selected to be within the at least one associated temperature range or setpoint humidity that is selected to be within the at least one associated humidity range based on a combined analysis of a predicted effect on the battery state indicator of controlling the container at the one or both of the setpoint temperature or the setpoint humidity and a predicted effet on the temperature control system reliability indicator in operating the temperature control system at the one or both of the setpoint temperature or the setpoint humidity; and sending, using the at least one controller, one or more controls, indicative of the one or both the setpoint temperature or the setpoint humidity, via a communication interface to the temperature control system so that the temperature control system to control the container based on the one or both of the setpoint temperature or the setpoint humidity for the operation of the batteries in the container.

27. The method of claim 26, wherein determining, using the at least one controller, the one or both of the setpoint temperature or the setpoint humidity comprises:

inputting one or more inputs to one or more neural networks, the one or more neural networks configured to generate the predicted an effect on the battery state indicator and the predicted effect on the temperature control system reliability indicator; and selecting the one or both of the setpoint temperature or setpoint humidity using a container temperature or humidity optimizer.

28. The method of claim 27, wherein the one or more neural networks comprise:

a first neural network configured to output the predicted effect on the temperature control system reliability indicator; and a second neural network configured to output the predicted effect on the battery state indicator.

29. The method of claim 28, wherein the temperature control system reliability indicator comprises a predicted indicator regarding one or more compressors in the temperature control system.

30. The method of claim 29, wherein the predicted indicator regarding one or more compressors in the temperature control system comprises a predicted mean time between failures (MTBF) for the one or more compressors.

31. The method of claim 28, wherein the predicted effect on the battery state indicator comprises an estimated effect on battery state of charge (SoC).

32. The method of claim 28, wherein selecting, using the at least one controller, the one or both of the setpoint temperature or setpoint humidity using the container temperature or humidity optimizer comprises:

inputting the predicted effect on the temperature control system reliability indicator and the predicted effect on the battery state indicator to the container temperature or humidity optimizer in order for the container temperature or humidity optimizer to generate a plurality of solutions indicative of different setpoint temperatures or setpoint humidities for controlling the temperature control system; and evaluating the plurality of solutions based on both the temperature control system reliability indicator and the predicted effect on the battery state indicator.

33. The method of claim 32, wherein evaluating, using the at least one controller, the plurality of solutions based on both the temperature control system reliability indicator and the predicted effect on the battery state indicator comprises evaluating whether a respective solution improves one or both of the temperature control system reliability indicator and the predicted effect on the battery state indicator.

34. The method of claim 33, wherein the respective solution is evaluated, using the at least one controller, to determine whether there is improvement in the temperature control system reliability indicator and to determine whether the respective solution at least maintains the predicted effect on the battery state indicator.

35. The method of claim 34, wherein the temperature control system reliability indicator comprises a predicted mean time between failures (MTBF) for one or more compressors in the temperature control system;

wherein the predicted effect on the battery state indicator comprises a battery state of charge (SoC); and wherein the respective solution is evaluated, using the at least one controller, to determine whether there is improvement of the MTBF and whether the respective solution at least maintains the battery SoC.

36. The method of claim 27, wherein the one or more neural networks are configured to input an anomaly indicator indicative of one or more failures in the temperature control system; and wherein the one or more neural networks are configured to use the anomaly indicator in order to generate the predicted effect on the battery state indicator and the predicted effect on the temperature control system reliability indicator.

37. The method of claim 36, wherein the anomaly indicator is indicative of a number of anomalies in the temperature control system.

38. The method of claim 37, further comprising an anomaly detection model that determines the number of anomalies in the temperature control system.

39. The method of claim 38, wherein the anomaly detection model comprises Principal Component Analysis (PCA) algorithm that indicates faults in the temperature control system, a signal-to-noise ratio (SNR) process configured to determine a probability of a fault occurrence for the indicated faults, and a spectral residuals (SR) analysis that identifies one or more most likely faulty components in the temperature control system based on the probability of the fault occurrence.

40. The method of claim 38, wherein the anomaly detection model determines a number of a first type of anomalies in the temperature control system and a number of a second type of anomalies in the temperature control system, the first type of anomalies being indicative of a first type of fault, the second type of anomalies being indicative of a second type of fault, the first type of fault being different from the second type of fault; and wherein the one or more neural networks inputs the number of the first type of anomalies in the temperature control system and the number of the second type of anomalies in the temperature control system; and wherein the one or more neural networks uses the number of the first type of anomalies and the number of the second type of anomalies in order to predict generate the predicted effect on the battery state indicator and the predicted effect on the temperature control system reliability indicator.

41. The method of claim 40, wherein the one or more neural networks further:
   determine a first predetermined number of anomalies;
   determine a second predetermined number of anomalies;
   compare the number of the first type of anomalies with the first predetermined number in order to determine whether the first type of fault has occurred or will occur;
   compare the number of the second type of anomalies with the second predetermined number in order to determine whether the second type of fault has occurred or will occur; and
   generate the predicted effect on the battery state indicator and the predicted effect on the temperature control system reliability indicator based on determining whether the first type of fault has occurred or will occur and based on determining whether the second type of fault has occurred or will occur.

42. The method of claim 36, wherein the one or more neural networks input temperature inside the container housing the batteries, temperature outside of the container, humidity inside the container housing the batteries, humidity outside of the container, battery state of charge (SoC) and compressor cycling.

43. The method of claim 42, wherein the one or more neural networks comprise:
   a first neural network configured to output the predicted effect on the temperature control system reliability indicator;
   a second neural network configured to output the predicted effect on the battery state indicator;
   wherein the first neural network inputs the battery SoC; and
   wherein the second neural network inputs the compressor cycling.

44. The method of claim 26, wherein the batteries are housed within the container in power banks;
   wherein the container comprises a plurality of temperature sensors configured to generate sensor data;
   wherein a respective one of the plurality of temperature sensors is selected, using the at least one controller, based on analysis of reliability of the respective one of the plurality of temperature sensors and based on the respective one of the plurality of temperature sensors sensing a most problematic power bank of the batteries within the container.

45. The method of claim 26, wherein the temperature control system comprises a plurality of compressors; and
   further comprising determining, using the at least one controller, differential loading of the plurality of compressors.

46. The method of claim 45, wherein determining, using the at least one controller, differential loading of the plurality of compressors is responsive to determining sufficiency to perform the determination of the differential loading.

47. The method of claim 45, wherein determining, using the at least one controller, differential loading of the plurality of compressors is based on: a health indicator of one or both of the plurality of compressors; and at least one aspect of the one or both of the plurality of compressors.

48. The method of claim 47, wherein the at least one aspect of the one or both of the plurality of compressors comprises one or more of compressor cycling, compressor operation history or maintenance, or previous compressor lead/lag operation.

49. The method of claim 47, wherein the differential loading of the plurality of compressors is determined, using the at least one controller, dynamically.

50. The method of claim 49, dynamically determining, using the at least one controller, the differential loading of the plurality of compressors is based on input indicative of one or both of maintenance scheduling or budgetary information.

* * * * *